US012677158B2

(12) United States Patent
    Gideon, III

(10) Patent No.: US 12,677,158 B2
(45) Date of Patent: Jul. 7, 2026

(54) SYSTEMS, DEVICES, AND METHODS FOR DETERMINING THE PRESENCE OF A USER

(71) Applicant: Intrinsic Value, LLC, Nashville, TN (US)

(72) Inventor: Clarence J. Gideon, III, Nashville, TN (US)

(73) Assignee: Intrinsic Value, LLC, Nashville, TN (US)

( * ) Notice: Subject to any disclaimer, the term of this patent is extended or adjusted under 35 U.S.C. 154(b) by 0 days.

(21) Appl. No.: 19/265,908

(22) Filed: Jul. 10, 2025

(65) Prior Publication Data

US 2026/0075437 A1     Mar. 12, 2026

Related U.S. Application Data

(63) Continuation of application No. 18/883,700, filed on Sep. 12, 2024, now Pat. No. 12,513,531.

(51) Int. Cl.
     *H04W 16/18*       (2009.01)
     *H04W 4/021*       (2018.01)
     *H04W 4/90*        (2018.01)

(52) U.S. Cl.
     CPC ........... *H04W 16/18* (2013.01); *H04W 4/021* (2013.01); *H04W 4/90* (2018.02)

(58) Field of Classification Search
     CPC ........ H04W 16/18; H04W 4/021; H04W 4/90
     See application file for complete search history.

(56) References Cited

U.S. PATENT DOCUMENTS

| | | | | |
|---|---|---|---|---|
| 5,894,506 A | * | 4/1999 | Pinter | ................. H04M 11/022 |
| | | | | 340/7.53 |
| 7,498,985 B1 | | 3/2009 | Woo | |
| 8,844,050 B1 | | 9/2014 | Miasnik | |
| 9,867,023 B2 | * | 1/2018 | Rauner | ................ G08B 25/006 |
| 10,291,777 B1 | * | 5/2019 | Luo | ...................... H04M 3/5116 |
| 10,306,449 B2 | | 5/2019 | Gideon, III | |
| 10,395,290 B1 | | 8/2019 | Koo | |
| 10,506,413 B2 | | 12/2019 | Gideon, III | |
| 10,516,983 B2 | | 12/2019 | Gideon, III | |
| 10,869,181 B2 | | 12/2020 | Gideon, III | |
| 11,050,760 B2 | | 6/2021 | Gideon, III | |
| 11,259,165 B2 | | 2/2022 | Gideon, III | |
| 11,356,833 B2 | | 6/2022 | Martin | |
| 2005/0049007 A1 | * | 3/2005 | Cho | ................... H04M 1/7243 |
| | | | | 455/566 |

(Continued)

FOREIGN PATENT DOCUMENTS

| | | | | |
|---|---|---|---|---|
| CN | 1582563 A | * | 2/2005 | ......... H04M 3/5116 |

*Primary Examiner* — Kenny S Lin

(57) ABSTRACT

A method and system for specifying a defined area of coverage, determining who is in the defined area, and using the presence in the defined area for payroll purposes. A digital representation of the defined area of the coverage is loaded into a safety service platform, and the safety service platform monitoring location information from a safety component on a client device. The location information of the client devices located outside of the defined area of the coverage is disregarded and the remaining location information, along with date, time, and client device identification information, are stored in a database on the safety service platform. The database may be used for locating users for safety reasons or to determine pay.

15 Claims, 24 Drawing Sheets

(56)         References Cited

U.S. PATENT DOCUMENTS

| | | | |
|---|---|---|---|
| 2007/0136132 A1* | 6/2007 | Weiser | G06Q 30/0261 |
| | | | 705/14.64 |
| 2007/0178909 A1 | 8/2007 | Doyle | |
| 2012/0096490 A1 | 4/2012 | Barns, Jr. | |
| 2012/0190386 A1 | 7/2012 | Anderson | |
| 2013/0052983 A1* | 2/2013 | Fletcher | H04L 67/303 |
| | | | 455/404.2 |
| 2013/0052984 A1* | 2/2013 | Mohler | H04M 3/5116 |
| | | | 455/404.2 |
| 2013/0171958 A1* | 7/2013 | Goodson | H04W 4/90 |
| | | | 455/404.2 |
| 2013/0231137 A1 | 9/2013 | Hugie | |
| 2013/0325572 A1 | 12/2013 | Plut | |
| 2014/0085107 A1 | 3/2014 | Gutierrez | |
| 2015/0039590 A1 | 2/2015 | Kim | |
| 2015/0046320 A1 | 2/2015 | Baldwin | |
| 2015/0161553 A1 | 6/2015 | Eggleston | |
| 2016/0353266 A1* | 12/2016 | Winkler | H04W 12/08 |
| 2017/0180963 A1 | 6/2017 | Cavendish | |
| 2017/0300162 A1 | 10/2017 | Jang | |
| 2017/0325056 A1 | 11/2017 | Mehta | |
| 2018/0165722 A1 | 6/2018 | Mirabito, Jr. | |
| 2018/0270667 A1 | 9/2018 | Gideon, III | |
| 2018/0310123 A1 | 10/2018 | Deluca | |
| 2018/0338237 A1 | 11/2018 | Maheswaranathan | |
| 2019/0279447 A1 | 9/2019 | Ricci | |
| 2019/0387387 A1* | 12/2019 | Suxena | H04W 4/029 |
| 2020/0042950 A1 | 2/2020 | Gulden | |
| 2020/0068377 A1 | 2/2020 | Gideon, III | |
| 2020/0244797 A1 | 7/2020 | Horelik | |
| 2020/0314240 A1 | 10/2020 | Leavitt | |
| 2021/0084480 A1 | 3/2021 | Maier | |
| 2021/0183174 A1 | 6/2021 | Wells | |
| 2021/0232642 A1 | 7/2021 | Ricci | |
| 2022/0174549 A1* | 6/2022 | Tsiatsikas | H04N 7/15 |
| 2022/0292543 A1 | 9/2022 | Henderson | |
| 2023/0097022 A1* | 3/2023 | Leavitt | H04W 76/15 |
| | | | 370/329 |
| 2024/0223691 A1* | 7/2024 | Lofton | H04M 1/72418 |
| 2024/0388657 A1* | 11/2024 | Fucci | H04M 3/5116 |
| 2024/0396625 A1 | 11/2024 | Martin | |
| 2025/0029474 A1* | 1/2025 | Beckwith | H04L 65/1095 |
| 2025/0071205 A1* | 2/2025 | Dizengof | H04M 3/5116 |

\* cited by examiner

410 —
420 —
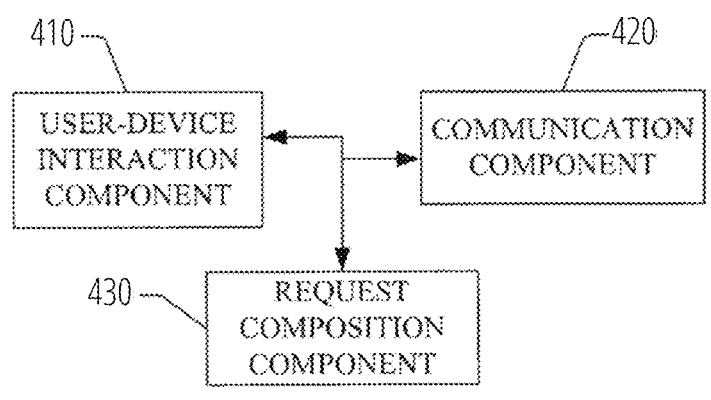
430 —
FIG. 4
500 —
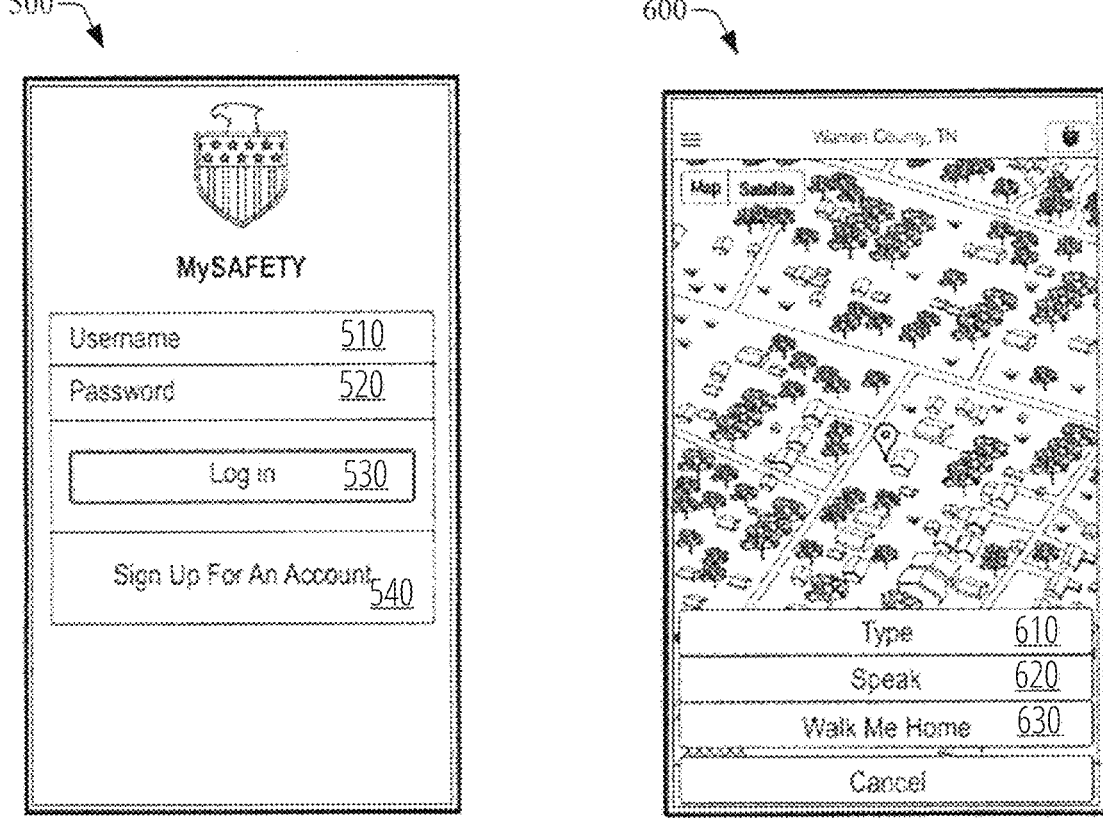
FIG. 5
600 —
FIG. 6

700 ⟶

800 ⟶

900
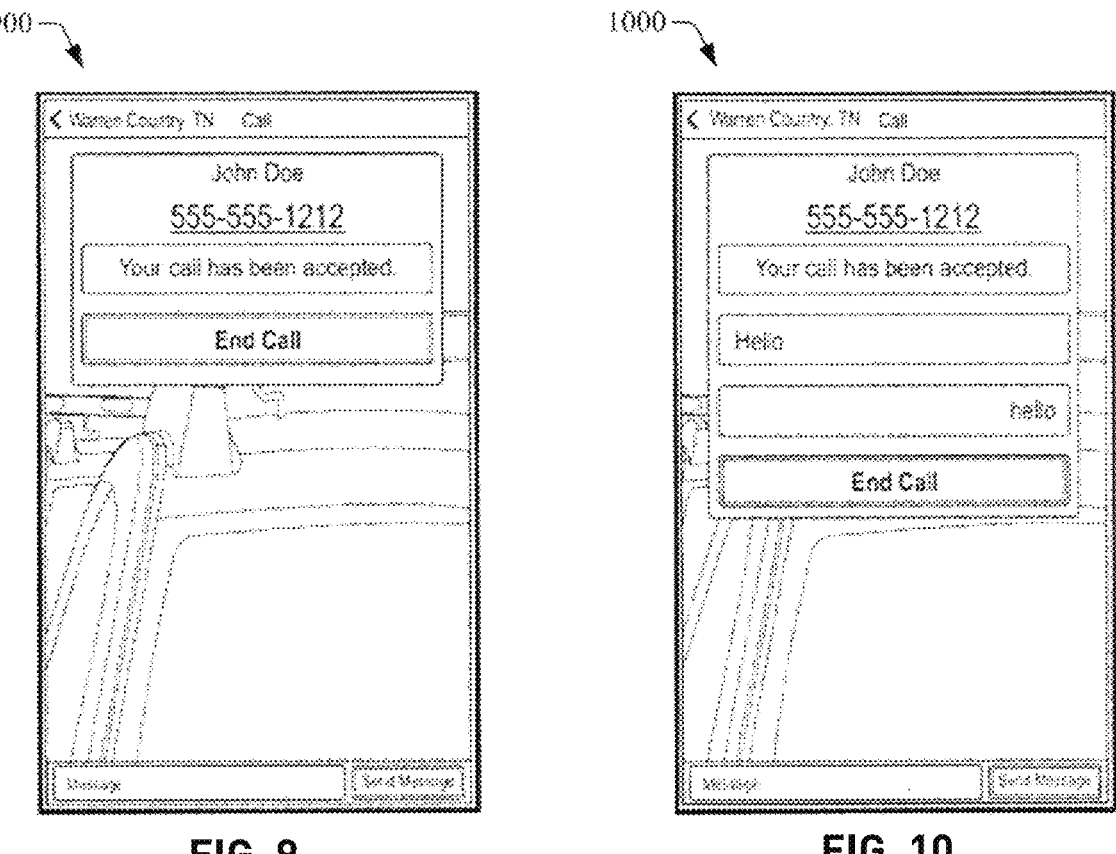
FIG. 9
1000
FIG. 10
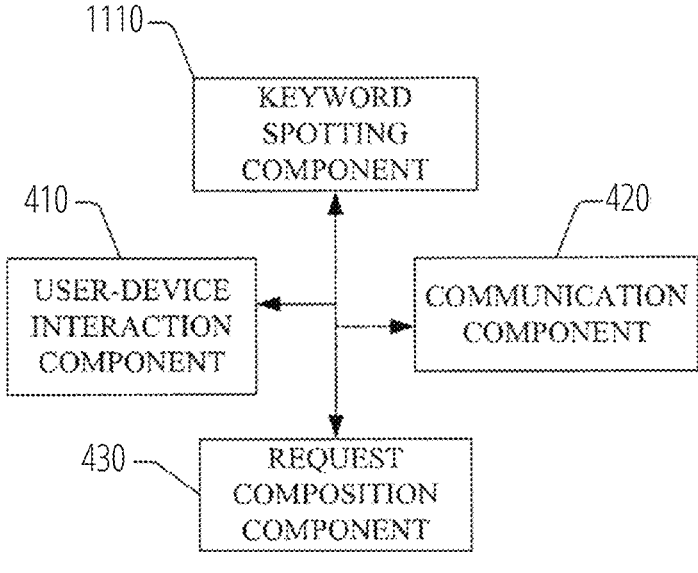
FIG. 11

1900

MySAFETY

Welcome
Officer 1

2000

2010a          2010b 2020          2030

Open Stream

2100

Welcome, Officer Bradley

2110

You are currently online. This means you can receive incoming calls.

Bill Brasky
555-5555 - Text                                    2030

Steve McQueen
555-5556 - Walk Me Home

Joan Baez
555-5557 - Call

Joe Smith
555-5558 - Distress

Bob Jones
555-5559 - Text

Gil Brown
555-5560 - Call

Lacy Williams
555-5563 - Call

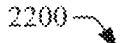
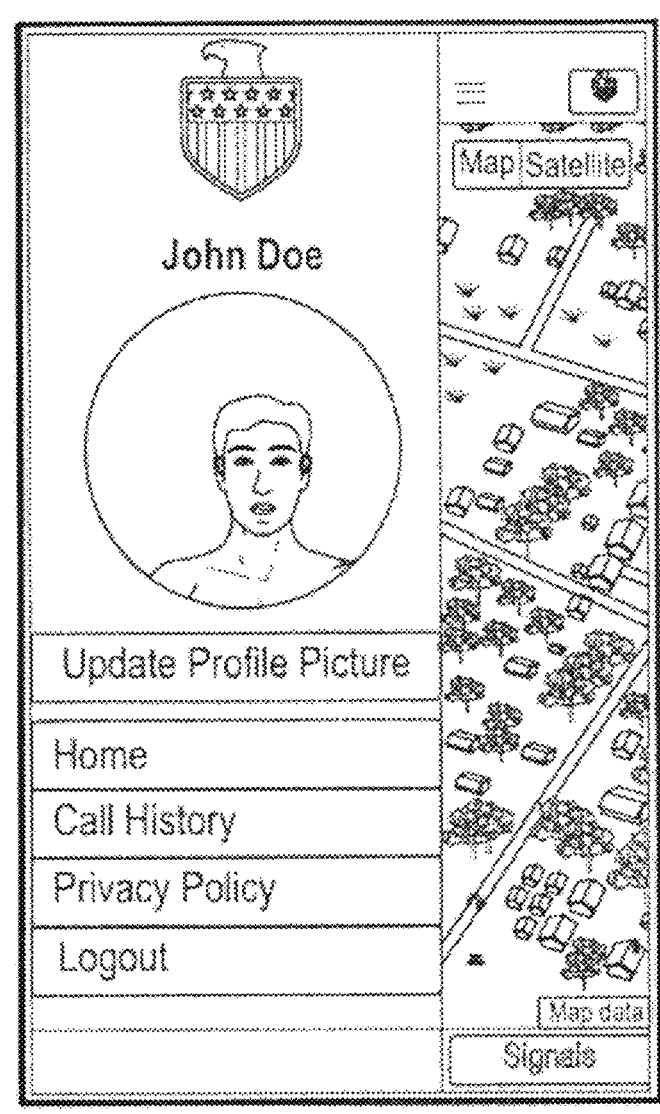
FIG. 22

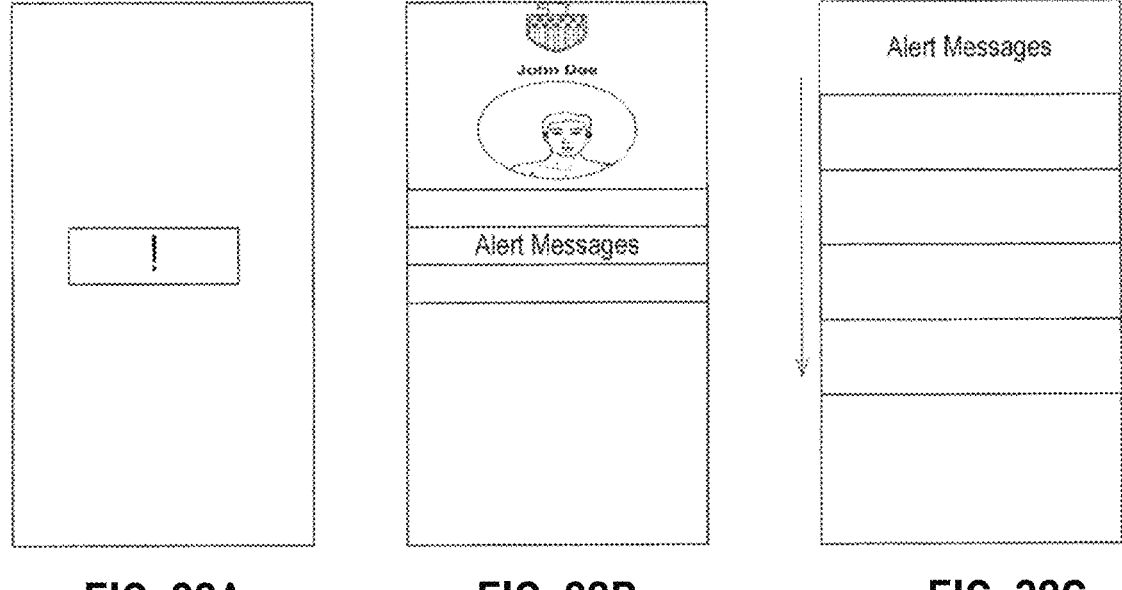
FIG. 29A       FIG. 29B       FIG. 29C

John Doe

Alert Messages

Call History

Helpline Resources

Helpline Resources

| Sexual Assault Center | 555-333-4444 Call | Website Directions |
|---|---|---|
| Addiction Center | 555-777-9999 Call | Website Directions |

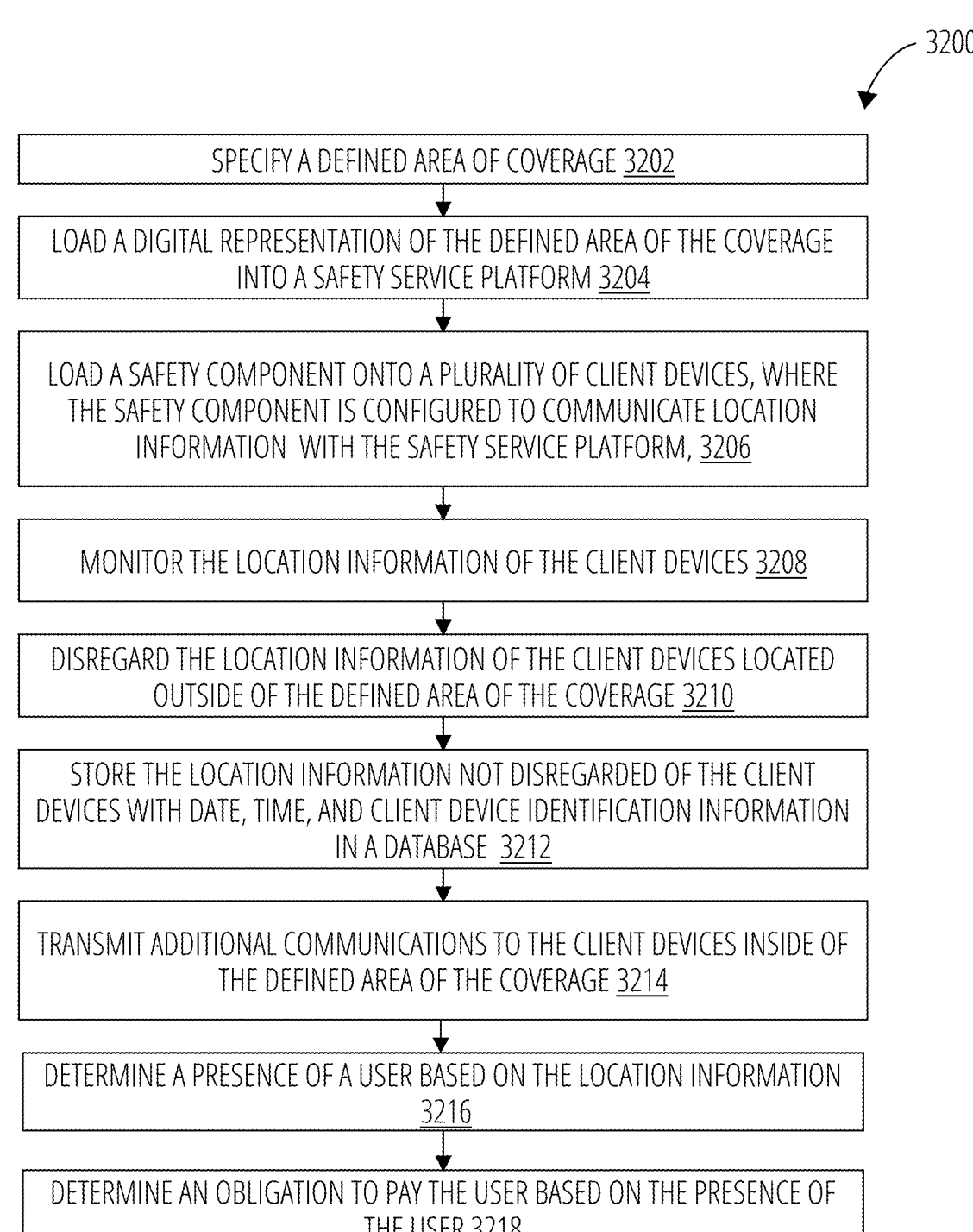

3200

SPECIFY A DEFINED AREA OF COVERAGE 3202

LOAD A DIGITAL REPRESENTATION OF THE DEFINED AREA OF THE COVERAGE INTO A SAFETY SERVICE PLATFORM 3204

LOAD A SAFETY COMPONENT ONTO A PLURALITY OF CLIENT DEVICES, WHERE THE SAFETY COMPONENT IS CONFIGURED TO COMMUNICATE LOCATION INFORMATION WITH THE SAFETY SERVICE PLATFORM, 3206

MONITOR THE LOCATION INFORMATION OF THE CLIENT DEVICES 3208

DISREGARD THE LOCATION INFORMATION OF THE CLIENT DEVICES LOCATED OUTSIDE OF THE DEFINED AREA OF THE COVERAGE 3210

STORE THE LOCATION INFORMATION NOT DISREGARDED OF THE CLIENT DEVICES WITH DATE, TIME, AND CLIENT DEVICE IDENTIFICATION INFORMATION IN A DATABASE 3212

TRANSMIT ADDITIONAL COMMUNICATIONS TO THE CLIENT DEVICES INSIDE OF THE DEFINED AREA OF THE COVERAGE 3214

DETERMINE A PRESENCE OF A USER BASED ON THE LOCATION INFORMATION 3216

DETERMINE AN OBLIGATION TO PAY THE USER BASED ON THE PRESENCE OF THE USER 3218

SYSTEMS, DEVICES, AND METHODS FOR DETERMINING THE PRESENCE OF A USER

CROSS-REFERENCE TO RELATED APPLICATIONS

This application is a continuation of U.S. patent application Ser. No. 18/883,700 filed by inventor Clarence J. Gideon, III on Sep. 12, 2024, entitled "Systems, devices, and methods for determining the presence of a user" and is related to U.S. Pat. No. 11,259,165, "Systems, devices, and methods for determining the presence of a user", by inventor Clarence J. Gideon, III, said patent incorporated herein in its entirety by reference.

SUMMARY OF THE INVENTIONS

In some aspects, the techniques described herein relate to a method including: specifying a defined area of coverage; loading a digital representation of the defined area of the coverage into a safety service platform; loading a safety component onto a plurality of client devices, where the safety component is configured to communicate with the safety service platform, the communications include location information regarding the location of the plurality of the client devices; monitoring, by the safety service platform, the location information of the plurality of the client devices; disregarding the location information of the plurality of the client devices located outside of the defined area of the coverage; storing the location information not disregarded of the plurality of the client devices with date, time, and client device identification information in a database on the safety service platform; and transmitting, by the safety service platform, additional communications to the plurality of the client devices inside of the defined area of the coverage.

In some aspects, the techniques described herein relate to a method where the communication of the location information is periodic.

In some aspects, the techniques described herein relate to a method where the safety service platform periodically polls the plurality of the client devices for the location information.

In some aspects, the techniques described herein relate to a method where the communication of the location information occurs when the location information in one of the plurality of client devices changes.

In some aspects, the techniques described herein relate to a method where the safety component is configured to determine the location information from timing messages from one or more satellites.

In some aspects, the techniques described herein relate to a method where the safety component is configured to determine the location information from cellular signals.

In some aspects, the techniques described herein relate to a method where the safety component is configured to determine the location information from Wi-Fi signals.

In some aspects, the techniques described herein relate to a method further including determining, by the safety service platform, a presence of a user based on the location information from a client device in possession of the user.

In some aspects, the techniques described herein relate to a method further including determining, by the safety service platform, an obligation to pay the user based on the presence of the user.

In some aspects, the techniques described herein relate to a method further including determining, by the safety service platform, a location of a user in the defined area of the coverage based on the location information from a client device in possession of the user.

In some aspects, the techniques described herein relate to a system including: a safety component implemented in a client device, the safety component configured to receive and transmit messages over a network, the messages including client device location information; and a safety service platform including: a system repository including: a digital representation of a defined area of coverage, functionality instructions, and a database of user specific information, where the user specific information includes date, time, client device identification, and the client device location information; and a safety server device, where the safety server device is configured to: send and receive the messages from the safety component; extract the client device location information from the messages; compare the client device location information to the defined area of the coverage; disregard the client device location information that is outside of the defined area of the coverage; and store the user specific information in the database, where the user specific information includes the date, the time, the client device identification, and the client device location information from the messages.

In some aspects, the techniques described herein relate to a system where the messages with the client device location information are periodically sent from the safety component to the safety server device.

In some aspects, the techniques described herein relate to a system where the safety server device periodically polls the client device for the client device location information.

In some aspects, the techniques described herein relate to a system where the messages of the client device location information are sent from the safety component to the safety server device whenever the client device location information changes.

In some aspects, the techniques described herein relate to a system where the safety component is configured to determine the client device location information from timing messages from one or more satellites.

In some aspects, the techniques described herein relate to a system where the safety component is configured to determine the client device location information from cellular signals.

In some aspects, the techniques described herein relate to a system where the safety component is configured to determine the client device location information from Wi-Fi signals.

In some aspects, the techniques described herein relate to a system where the safety server device determines a presence of a user based on the client device location information from a specific client device in possession of the user.

In some aspects, the techniques described herein relate to a system where the safety server device determines an obligation to pay the user based on the presence of the user.

In some aspects, the techniques described herein relate to a system where the safety server device determines a location of a user in the defined area of the coverage based on the client device location information from a specific client device in possession of the user.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure may be implemented in many different forms and should not be construed as limited to the implementations set forth herein. Like numbers refer to like, but not necessarily the same or identical, elements throughout.

Figure 1:
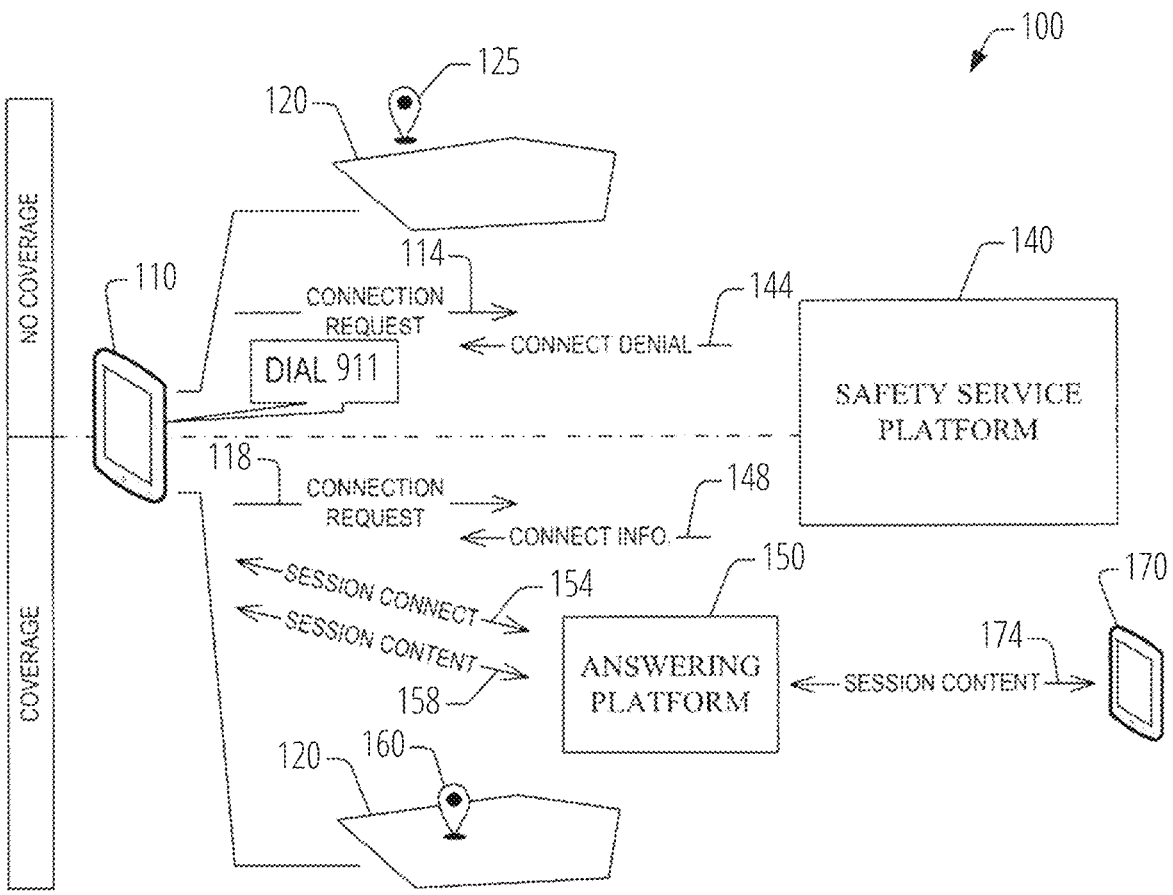

FIG. 1 presents an example of an operational environment for emergency responses in accordance with one or more embodiments of the disclosure.

Figure 2:
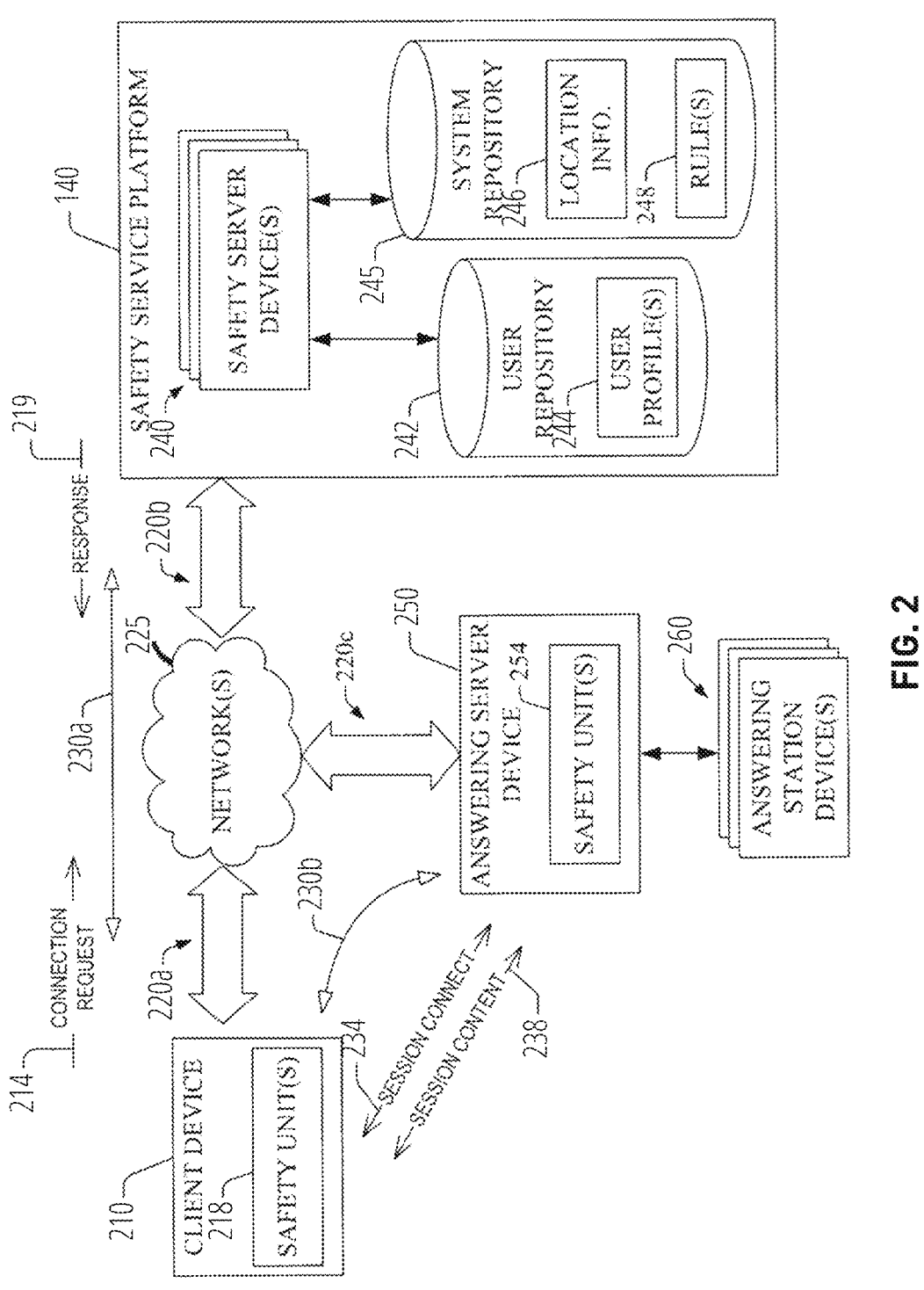

FIG. 2 presents another example of an operational environment for emergency responses in accordance with one or more embodiments of the disclosure.

Figure 3:
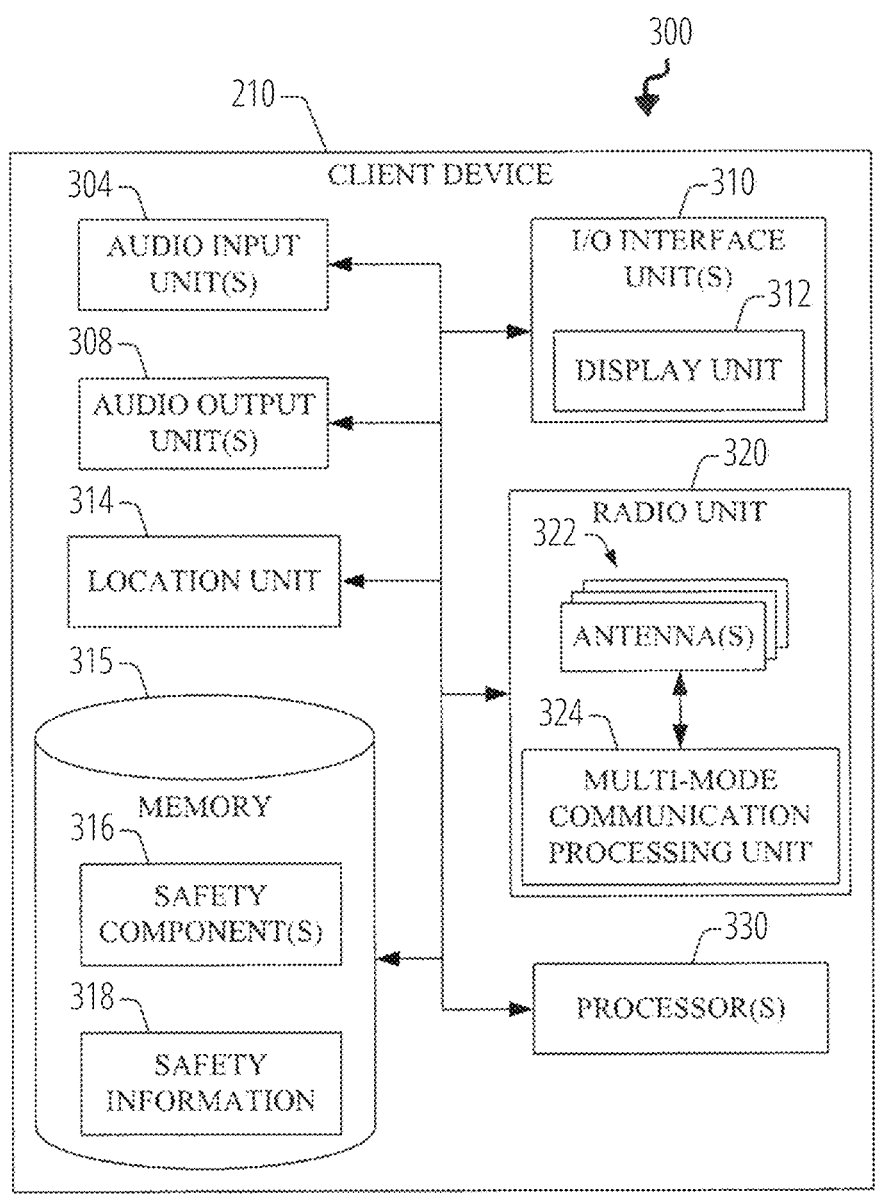

FIG. 3 presents an example of a client device for emergency responses in accordance with one or more embodiments of the disclosure.

FIG. 4 presents an example of safety components for emergency responses in accordance with one or more embodiments of the disclosure.

FIG. 5 presents an example of a user interface for emergency responses in accordance with one or more embodiments of the disclosure.

FIG. 6 presents another example of a user interface for emergency responses in accordance with one or more embodiments of the disclosure.

FIG. 7 to FIG. 10 present examples of user interfaces for emergency responses in accordance with one or more embodiments of the disclosure.

FIG. 11 presents another example of safety components for emergency responses in accordance with one or more embodiments of the disclosure.

Figure 12:
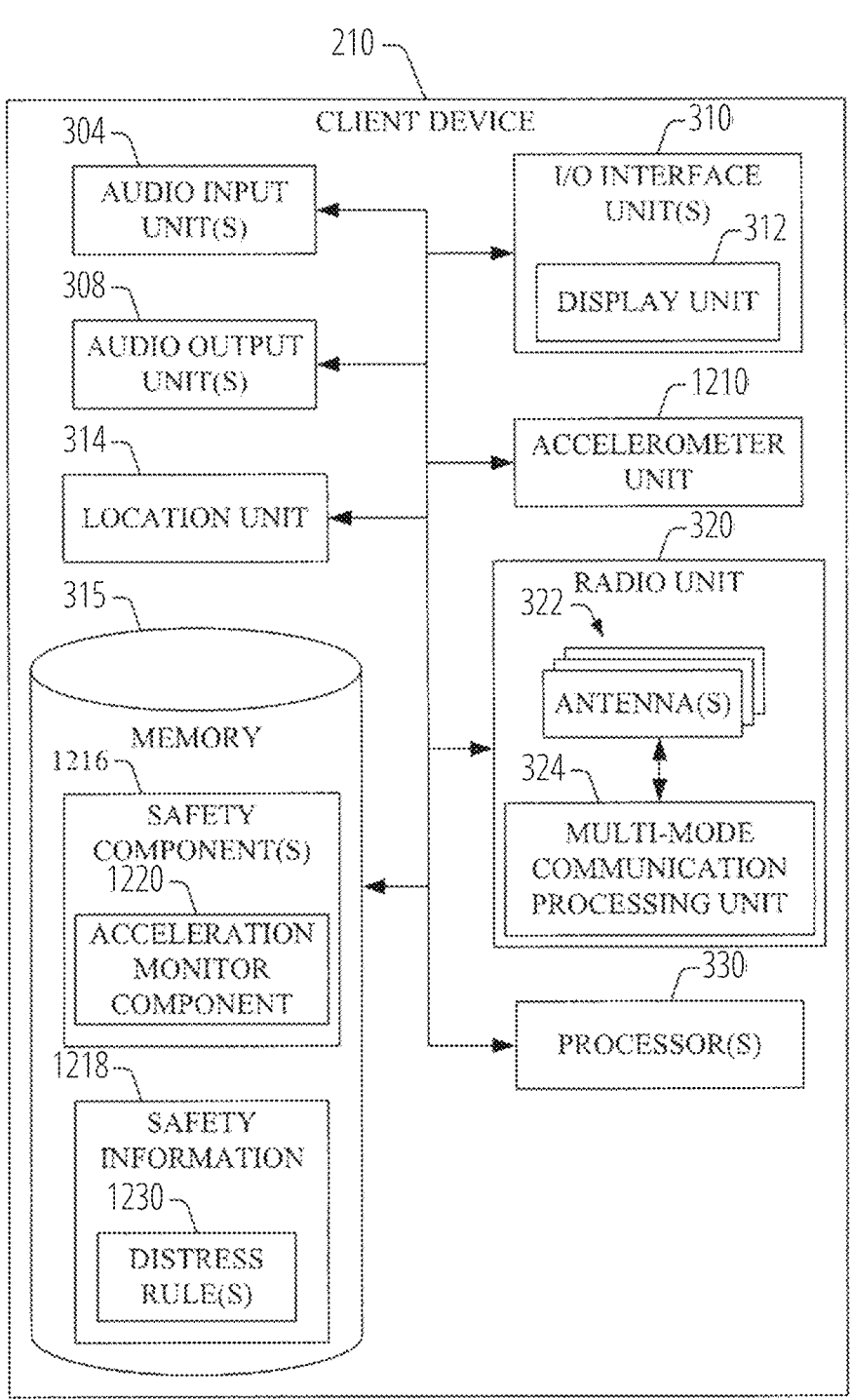

FIG. 12 presents another example of a client device for emergency responses in accordance with one or more embodiments of the disclosure.

Figure 13:
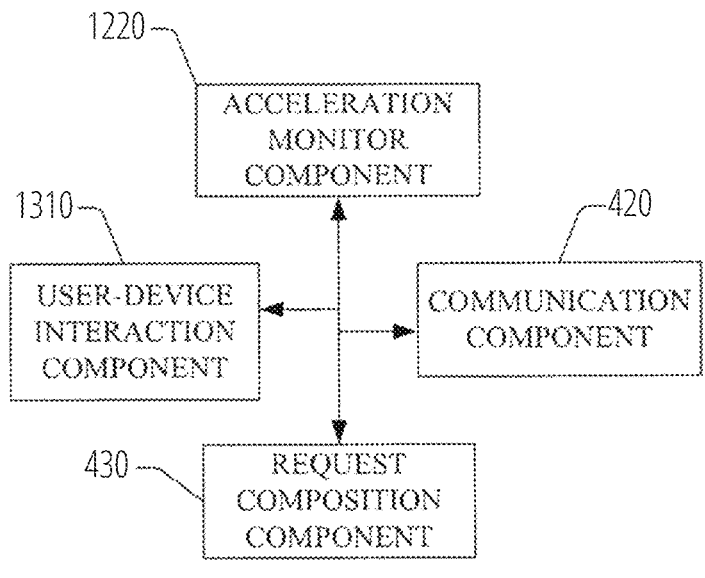

FIG. 13 presents another example of safety components for emergency responses in accordance with one or more embodiments of the disclosure.

Figure 14:
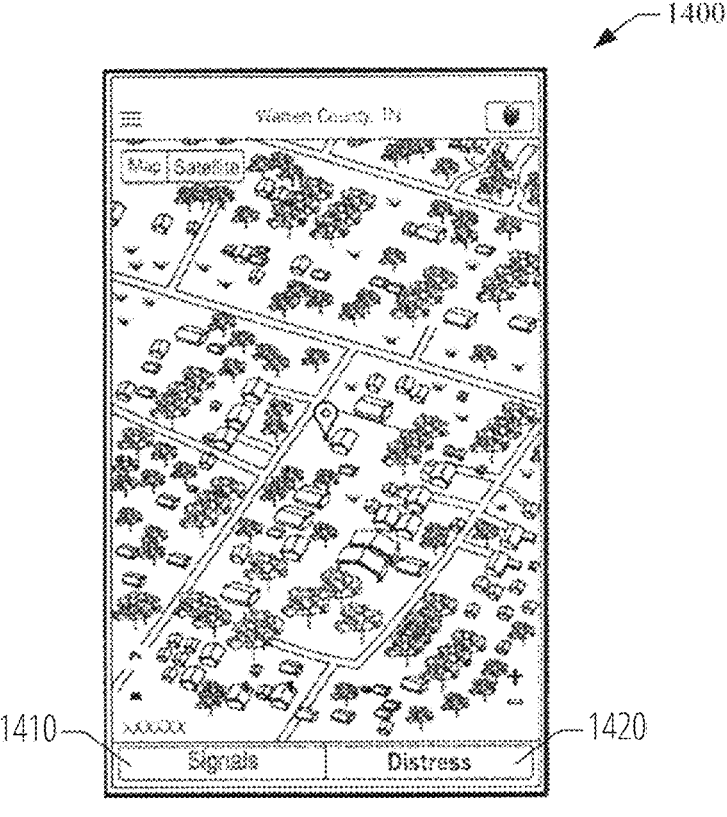

FIG. 14 presents an example of a user interface for emergency responses in accordance with one or more embodiments of the disclosure.

FIG. 15 to FIG. 18 present other examples of user interfaces for emergency responses in accordance with one or more embodiments of the disclosure.

Figures 19, 20, 21:
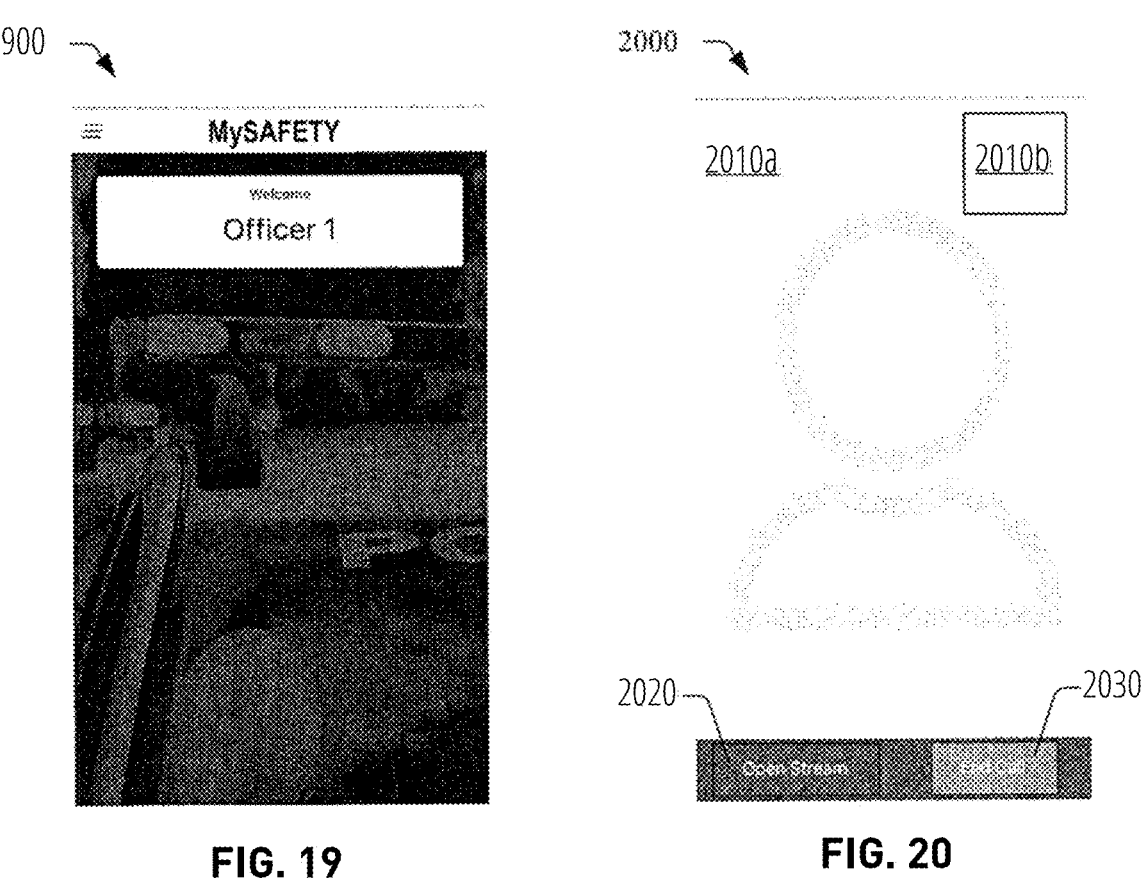

FIG. 19 to FIG. 21 present yet other examples of user interfaces for emergency responses in accordance with one or more embodiments of the disclosure.

FIG. 22 presents another example of a user interface for emergency responses in accordance with one or more embodiments of the disclosure.

Figure 23:
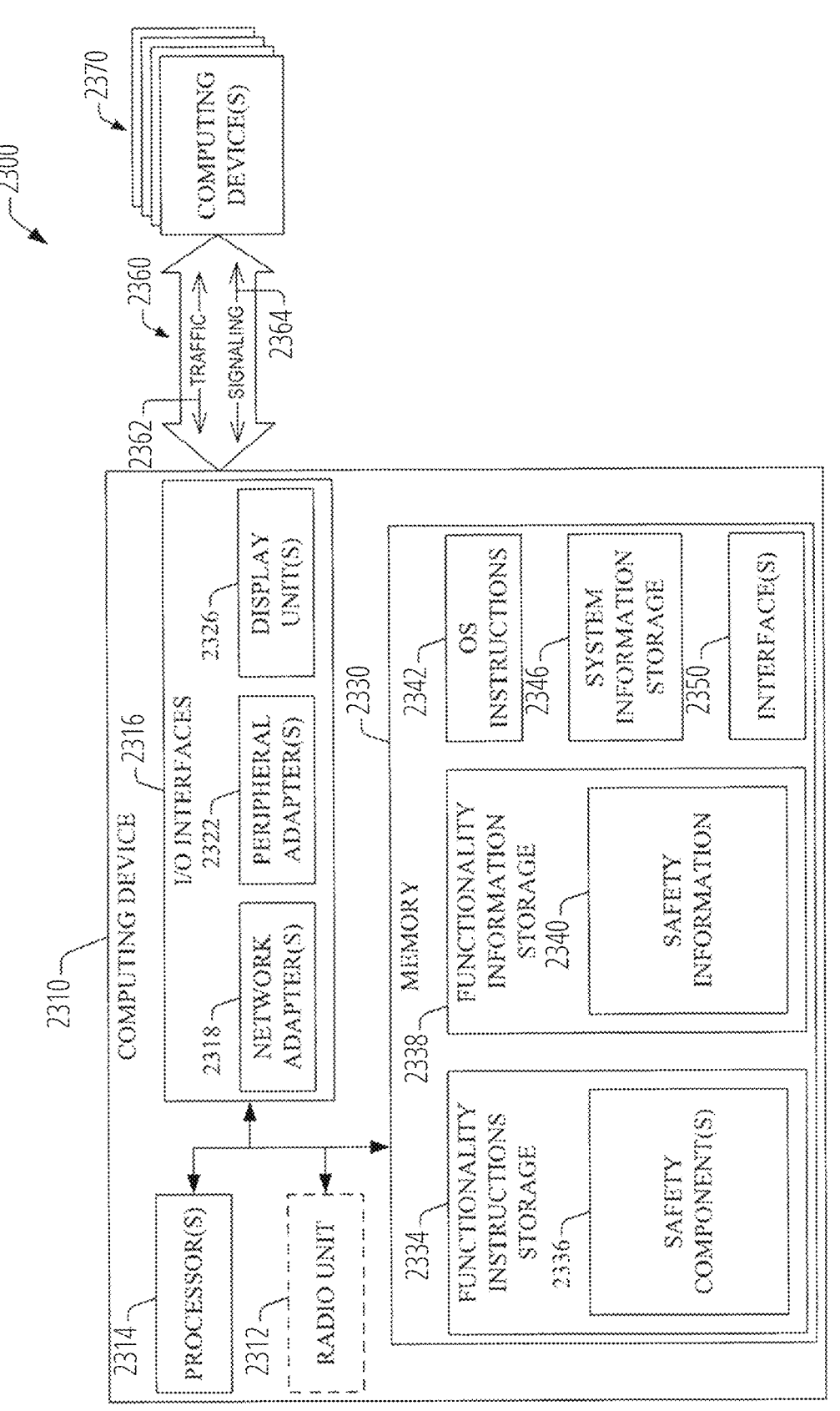

FIG. 23 presents an example computational environment for emergency responses in accordance with one or more embodiments of the disclosure.

Figure 24:
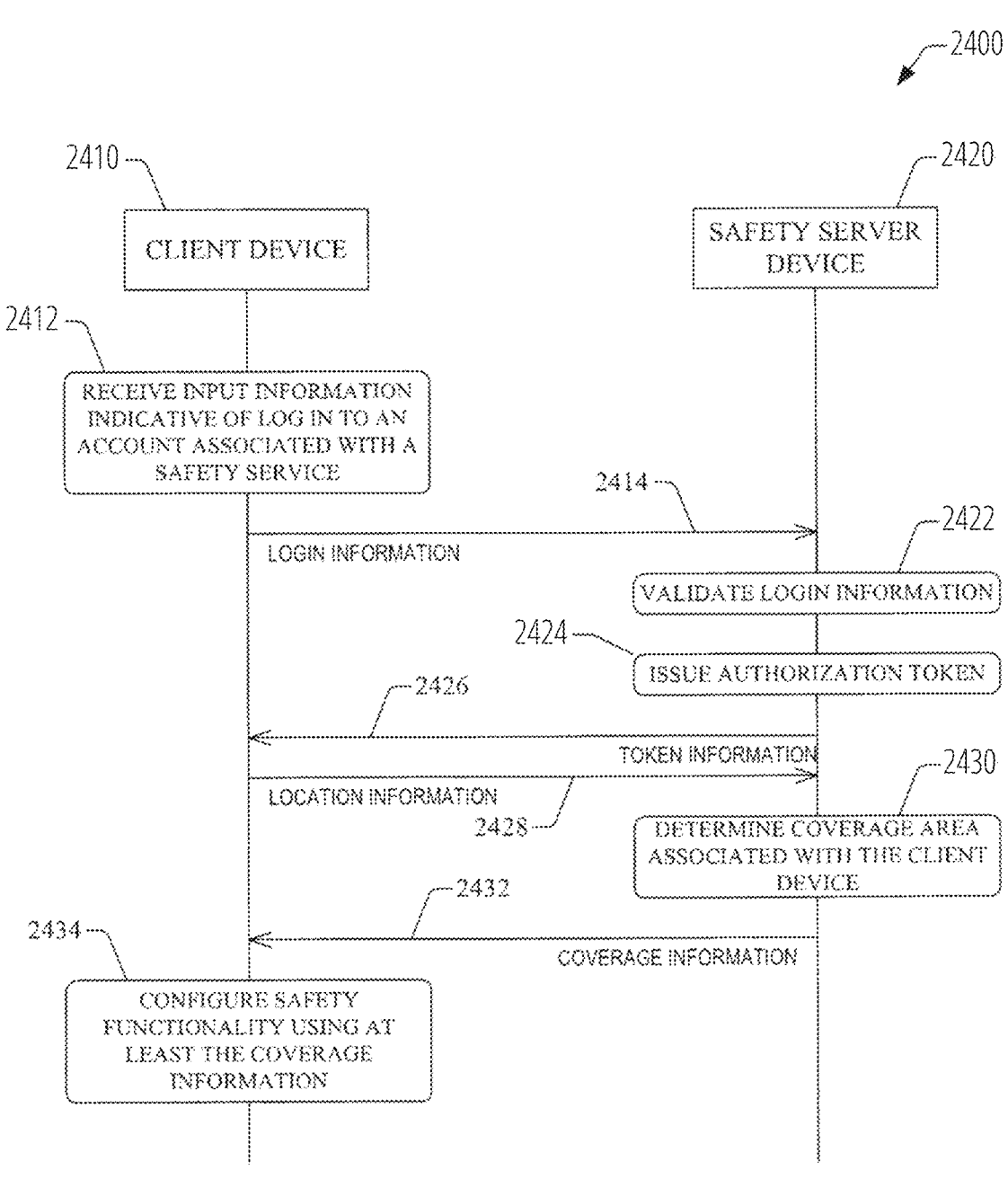
Figure 25:
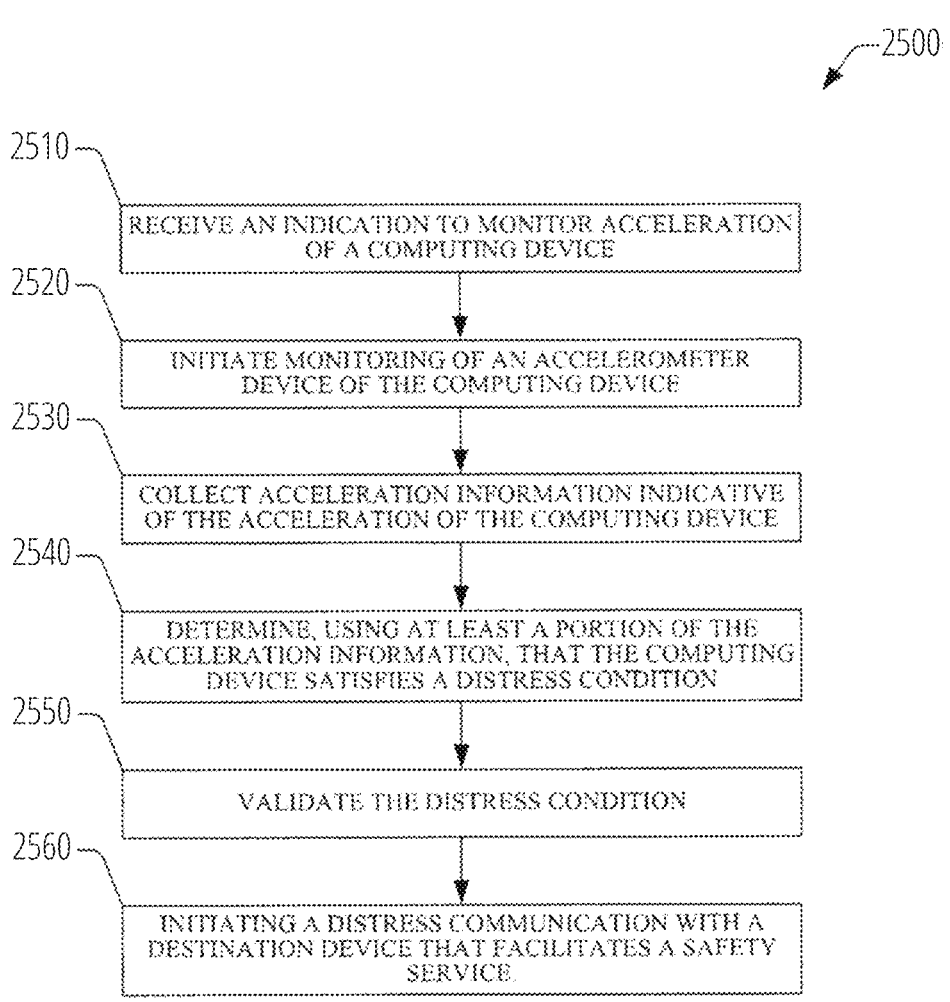

FIG. 24 to FIG. 25 present example methods in accordance with one or more embodiments of the disclosure.

Figure 26:
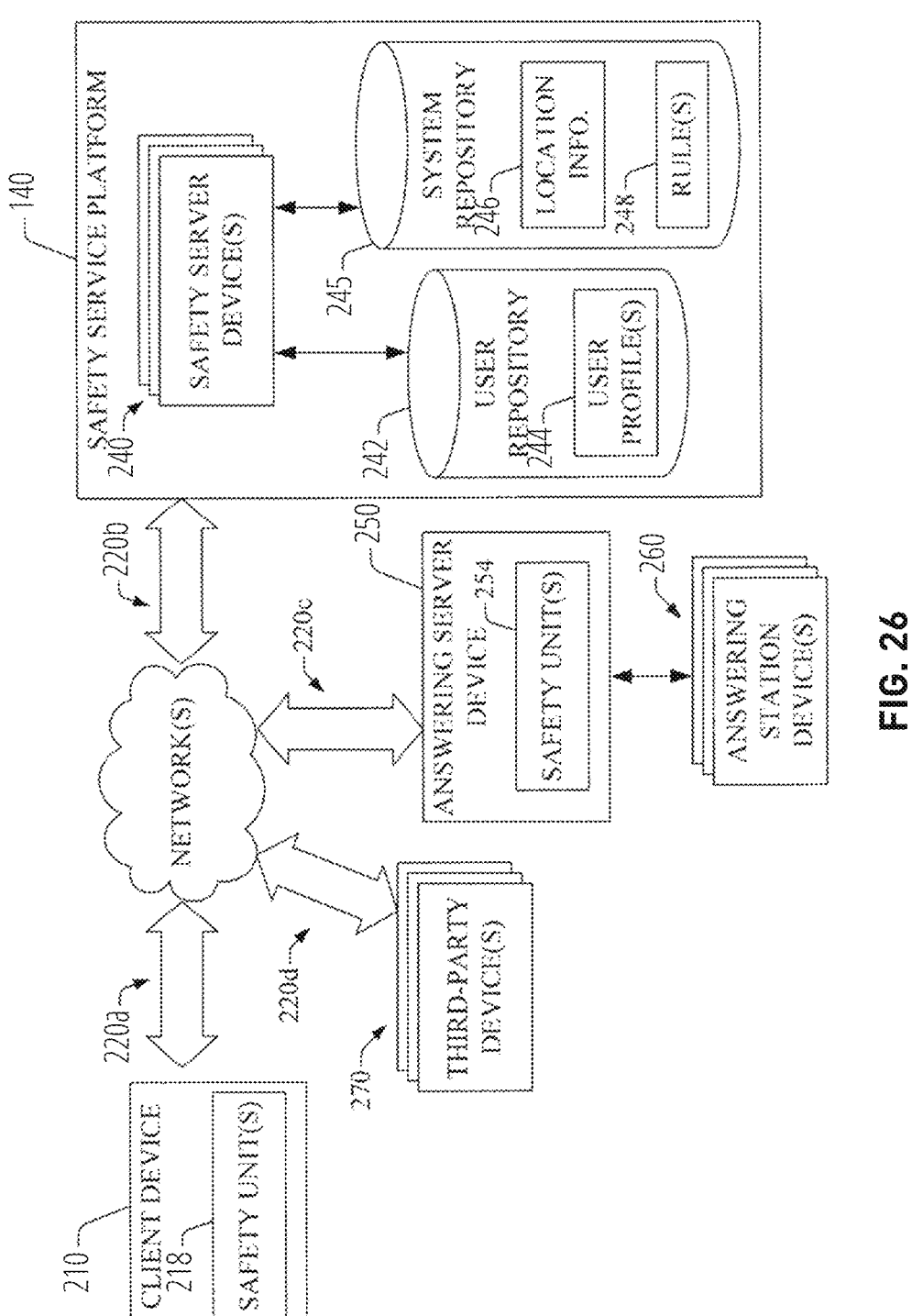

FIG. 26 presents another example of an operational environment for emergency responses in accordance with one or more embodiments of the disclosure.

Figure 27A:
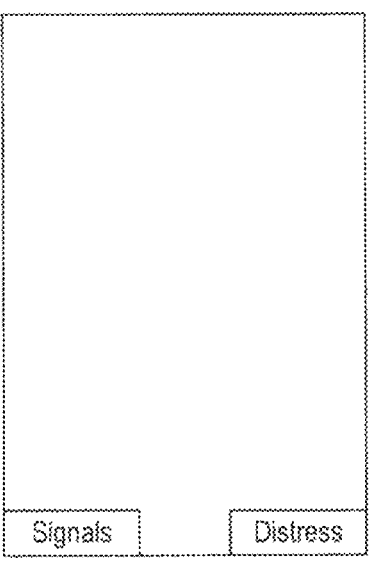
Figure 27B:
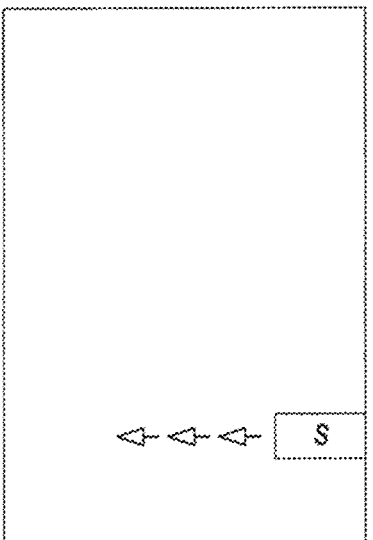
Figure 27C:
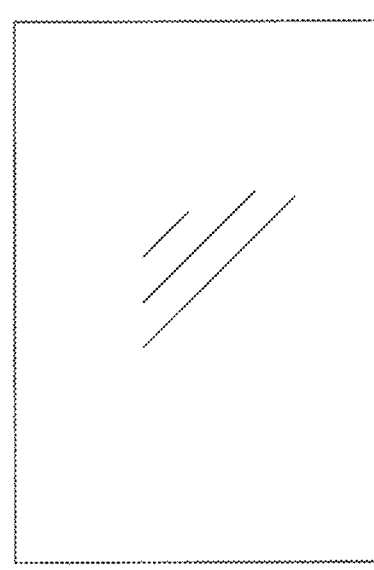

FIG. 27A, FIG. 27B, and FIG. 27C present examples of user interfaces for emergency responses in accordance with one or more embodiments of the disclosure.

Figure 28A:
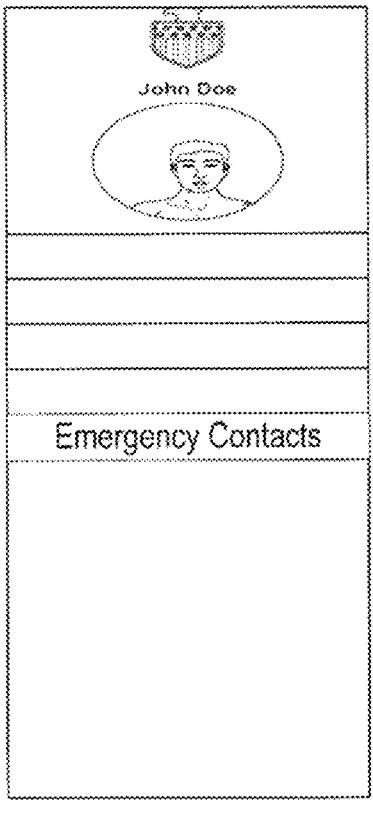
Figure 28B:
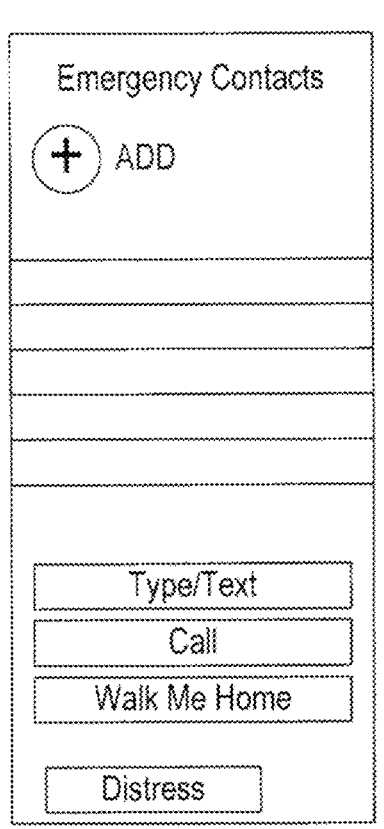

FIG. 28A and FIG. 28B present examples of user interfaces for emergency responses in accordance with one or more embodiments of the disclosure.

FIG. 29A, FIG. 29B, and FIG. 29C present examples of user interfaces for emergency responses in accordance with one or more embodiments of the disclosure.

4

Figures 30A, 30B:
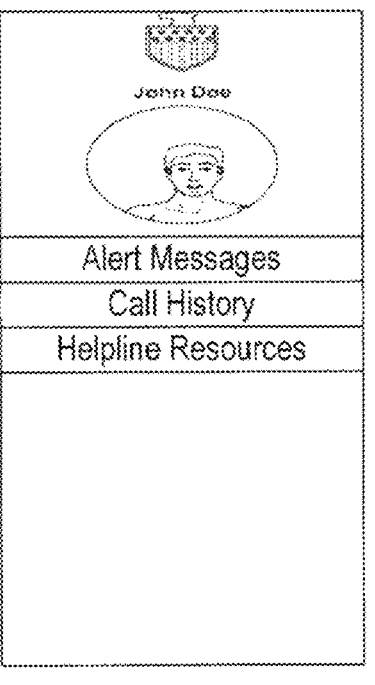

FIG. 30A and FIG. 30B present examples of user interfaces for emergency responses in accordance with one or more embodiments of the disclosure.

Figure 31:
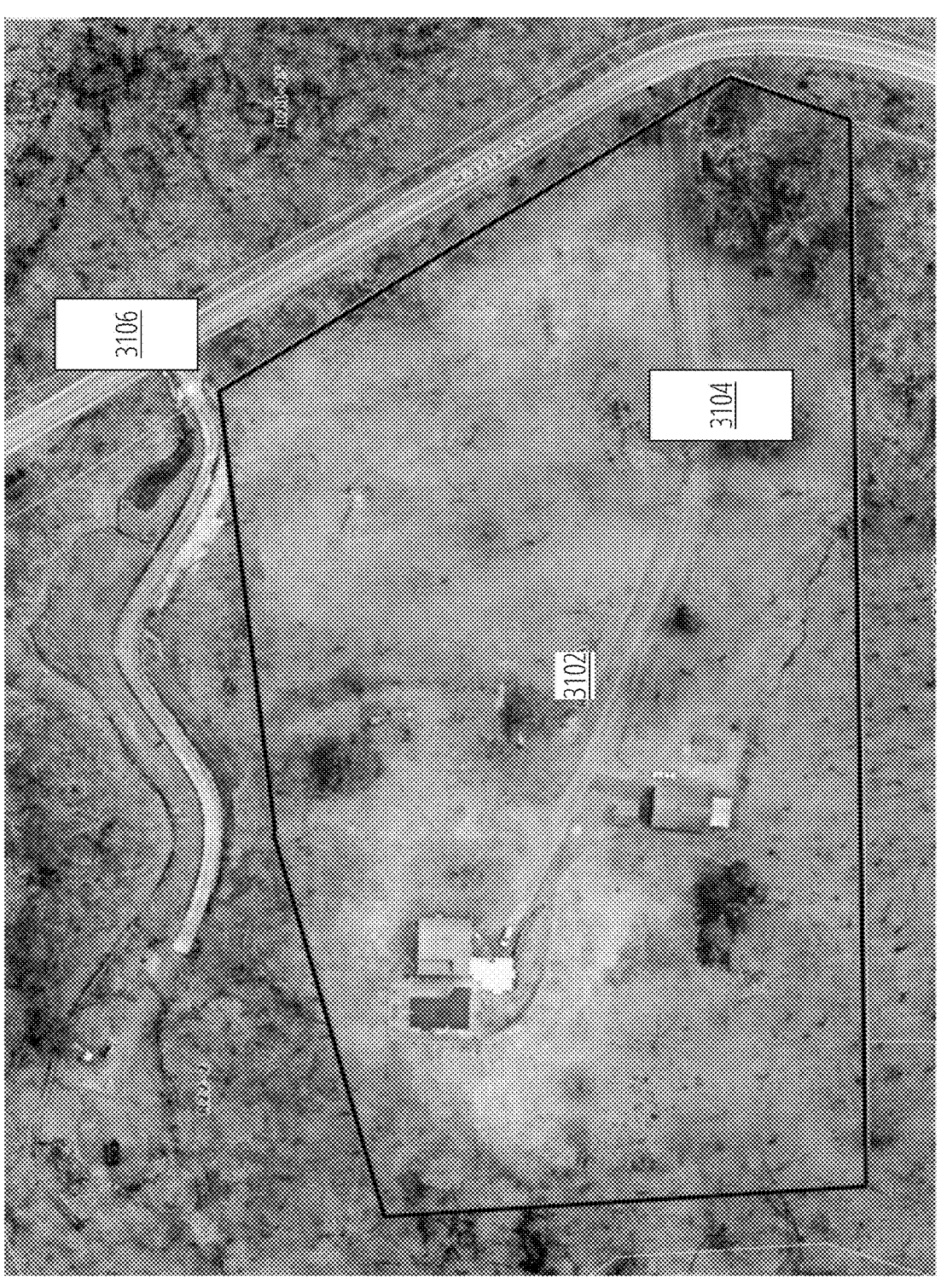

FIG. 31 illustrates a defined area of coverage with several client devices.

FIG. 32 illustrates a flowchart 3200 in accordance with one embodiment.

DETAILED DESCRIPTION

This disclosure provides, in at least some embodiments, systems, devices, methods, and/or computer-readable non-transitory storage media for emergency responses. In some embodiments, a client device may be provided with a response to an emergency via a networked system that may determine that the client device is located within a defined area of coverage, and may route a call session to an answering platform associated with an answering station device that may facilitate or otherwise provide a safety service. Client devices located outside the coverage area may be directed to communicate via a call to 911. While various embodiments are illustrated in connection with client devices that embody or constitute mobile devices, the disclosure is not so limited and other types of client devices (such as stationary computing devices) are contemplated. In addition or in some embodiments, the functionality described herein in connection with emergency responses may be customized. Customization provides flexibility and may be made to satisfy specific constraints of an organization (e.g., a local government, a school, and the like) that utilizes or otherwise leverages the functionality described herein.

FIG. 1 illustrates an example of an environment 100 for emergency responses in accordance with one or more disclosed embodiments. The environment 100 includes a device 110 which may be configured to operate in accordance with aspects of this disclosure. To that end, computer-accessible instructions (e.g., computer-readable and/or computer-executable instructions) may be retained in one or more memory devices of the mobile device 110. In response to execution by a processor circuit, the computer-accessible instructions may cause the mobile device 110 to operate in accordance with aspects of this disclosure. In some scenarios, the mobile device 110 may send a connection request 114 to establish a connection with a destination device that may provide or otherwise facilitate a safety service. For example, a destination device may include a device associated with a safety service platform 140, as described in greater detail below. The mobile device 110 may send the connection request 114 to a group of safety service platform devices 140 (collectively referred to as safety service platform 140). The safety service may have a defined coverage area 120. For instance, the coverage area 120 may correspond to an area associated with a public-safety answering point (PSAP) (or, in some instances, public-safety access point) center within a defined region (e.g., a county). In one scenario, the mobile device 110 may send the connection request 114 from a location 125 outside the defined coverage area 120. In such a scenario, a safety server device 240 within the safety service platform 140 may determine that the location 125 is outside the service coverage area 120. To that end, the connection request 114 may include information indicative of the location 125 of the mobile device 110. In response to such a determination, the safety service platform 140 may determine that service coverage is unavailable to the mobile device 110, and may send a connect denial message 114. The connect denial message 144 may be received by the mobile device 110 and may cause the mobile device 110 to direct an end-user of the mobile device 110 to dial 911, for example. More specifically, in one embodiment, in response to receiving the connect denial message 144, the mobile device 110 may display a message to dial 911. For instance, a display device of the mobile device 110 may present one or more visual elements indicating or otherwise instructing to dial 911. In addition or in another embodiment, the mobile device may render an audible signal indicating or otherwise instructing to dial 911.

In other scenarios, the mobile device 110 may be located at a location 160 within the service coverage area 120 and may send a connection request 118 to establish a connection with a destination device that may provide or that may facilitate providing the safety service. The connection request 118 may include information indicative of the location 160, and may be sent to the safety service platform 140. The safety server device 240 (depicted at least by FIG. 2) within the safety service platform 140 may receive the connection request 118 and may determine, using the location information, that the mobile device 110 is located within the service coverage area 120. In response, the safety server device 240 may send a connect information message 148 to the mobile device 110. The connection information message 148 may include an Internet protocol (IP) address or another type of communication address of a remote server device within a group of answering platform devices (collectively referred to as answering platform 150). In some embodiments, the remote server device (not depicted) may establish a first connection with the mobile device 110. Such a connection is represented with session connect 154. In addition, in some instances, the remote server device may determine that the destination device is available for communication, and may establish a second connection with the destination device. The destination device may be included, for example, within the answering platform 150. The first connection and the second connection may result in the requested connection, where the mobile device 110 is connected with the intended destination device.

Upon or after the requested connection is established, the mobile device 110 and the destination device may exchange session content 158. The session content 158 may include text messages (e.g., SMS messages and/or MMS messages), audio signals, and/or video signals.

In some embodiments, the destination device that communicates with the mobile device 110 may send (e.g., forward) at least a portion of the session content 158 to a third-party device, that may be a mobile telephone 170, for example. As such, as is illustrated in FIG. 1, such a destination device may send session content 174 to a mobile telephone 170. In addition, the mobile telephone 170 may send information (e.g., audio signals, video signals, and/or messages) to the mobile device 110 via the answering platform 150.

According to an embodiment, the destination device may be configured to re-establish a connection to the mobile device in the event that an established connection becomes lost or dropped. In this regard, during the process of establishing the connection with the mobile device, the destination device may gather contact information for the mobile device. The destination device may then determine that the established connection with the mobile device has been lost. Upon determination that the connection to the mobile device has been lost, the destination device may initiate a process to re-establish the connection with the mobile device based on the contact information for the mobile device. The destination device may then send a message to the mobile device providing information to re-establish the connection between the mobile device and the destination device. The message sent to the mobile device may take the form of a text message or phone call that may be received by the mobile device via the Hoplon™ app. The destination device may then re-establish the connection with the mobile device.

Upon re-establishing the connection with the mobile device, the destination device may then send a message to the mobile device requesting updated position information for the mobile device. In response to receiving the message from the destination device, the mobile device may determine location information indicating the position of the mobile device. The mobile device may then send a message to the destination device that includes the determined location information. The location information may be specified in terms of longitude and latitude coordinates of the mobile device and may be provided in the form of GPS coordinates. Alternatively, the location information may be specified in terms of a street address (e.g., 324 West Street). Upon receipt of the location information, the destination device may store data representing the position information for the mobile device. The destination device may further send one or more messages to the mobile device periodically to request updated location information for the mobile device to enable tracking of the mobile device, as described in greater detail below.

FIG. 2 illustrates another example of an operational environment for emergency responses in accordance with one or more embodiments of the disclosure. The environment 100 includes a client device 210 that may be configured to operate in accordance with aspects of this disclosure. In some embodiments, the client device 210 may embody or may constitute the mobile device 110. Similar to the mobile device 110, the client device 210 may include one or more safety units 218 (collectively referred to as safety unit(s) 218). In some scenarios, the client device 210 may send a connection request 214 to establish a connection with a destination device that may provide or otherwise facilitate a safety service. The client device 210 may be a mobile device and, thus, may configure (e.g., generate and/or format) the connection request 214 to include information indicative of a location of the client device 210. The client device 110 may utilize or otherwise leverage one or more networks 225 to send the connection request 214 to the safety service platform 140. One or more links 220a (wireless links and/or wireline links) may functionally couple the client device 210 to network 225, and one or more links 220b (wireless links and/or wireline links) may functionality couple network 225 to the safety service platform 140. More specifically, in some embodiments, network 225 may functionally couple the networks 225 to the one or more safety server devices 240. In some embodiments, the safety server device(s) 240 may embody or may constitute a group of host server devices that may implement a cloud-based processor-implemented solution implementing methods of the safety service platform of this disclosure.

As mentioned above, the safety service associated with the destination device, to which the client device 210 may connect, may have a defined coverage area. In some embodiments, the defined coverage area may be characterized as a geofence. As such, in some aspects, a safety server device 240 may utilize or otherwise leverage location information (e.g., GPS coordinates) included in the connection request 214 to determine a coverage state of the client device 210. Specifically, the safety service platform 140 may include location information 246 retained in one or more memory elements within one or more memory devices 245 (collectively referred to as system repository 245). The location information 246 may include a list (or another type of data structure) that designates a group of remote server devices and respective service coverage areas. In addition, the safety server device 240 may compare a location of the client device 210 to the service coverage area 120. Based at least on such a comparison, the server device may determine the coverage state of the client device 210. In one scenario, the safety server device 240 may determine that the location of the client device 210 is outside of the service coverage area 120 recorded or otherwise registered in the system repository 245. Therefore, the safety server device 240 may determine that the coverage state corresponds to an uncovered state, and may send a response 219 to the client device 210. In such a scenario, the response 219 may include a message indicative of denial of the connection request 214.

In another scenario, the safety server device 240 that assesses the connection request 214 at the safety service platform 140 may identify a service coverage area (that may or may not coincide with service coverage area 120) that contains the location of the client device 210. The identified coverage area may be associated with an answering server device 250 that may be located remotely from the client device 210. In one aspect, the answering server device 250 may be located at a site that may include multiple destination devices that provide or otherwise facilitate an emergency response service. Therefore, the answering server device 250 may determine that the coverage state corresponds to a covered state, and may configure the response 219 to include information indicative of a communication address (e.g., an IP address) of the answering server device 250. The safety server device 240 may send such a response 219 to the client device 210.

Regardless of the type of response 219, the client device 210 may receive the response 219 via a network pathway 230a. Receiving such a response 219 may cause the client device 210 to perform a predetermined action. In an example scenario in which the response 219 includes a connect denial message, the response 219 may cause the client device 210 to instruct a user to dial 911. For example, in response to receiving the connect denial message 144, the mobile device 110 may display a message instructing a user to dial 911. For instance, a display device of the mobile device 110 may present one or more visual elements indicating an instruction to dial 911. The mobile device may further render an audible signal indicating an instruction to dial 911.

In a further example in which the response 219 includes the communication address of the answering server device 250, receipt of such a response 219 may cause the client device 210 to initiate a connection with the answering server device 250. The client device 210 and the answering server device 250 may exchange messages to establish a first connection. The messages may include a session connect 234 instruction and may be exchanged via a network pathway 230b. The messages may include information indicating at least a portion of the link(s) 220a, at least one of the network(s) 225, and at least a portion of the link(s) 220c. Further, the answering server device 250 may be functionally coupled to one or more answering station devices 260, and may determine that a first answering station device 260 is available for communication. Thus, the answering server device 250 may establish a second connection between the client device 210 and a streaming server device that may be embodied in or may include, for example, at least one of the safety unit(s) 254. In addition, the answering server device 250 may establish a third connection between the streaming server device and the first answering station device 260. The second connection and the third connection may result in the completion of the connection request 214, wherein the client device 210 may be connected with the first answering station device.

Upon or after establishing the connection requested by the connection request 214, the client device 210 and the first answering station device may exchange session content 238. The session content 238 may include text messages (e.g., SMS messages and/or MMS messages), audio signals, video signals, etc.

According to an embodiment, the first answering station device may be configured to re-establish a connection to the mobile device in the event that an established connection becomes lost or dropped. In this regard, during the process of establishing the connection with the mobile device, the first answering station device may gather contact information for the mobile device. The first answering station device may then determine that the established connection with the mobile device has been lost. Upon determination that the connection to the mobile device has been lost, the first answering station device may initiate a process to re-establish the connection with the mobile device based on the contact information for the mobile device. The first answering station device may then send a message to the mobile device providing information to re-establish the connection between the mobile device and the first answering station device. The message sent to the mobile device may take the form of a text message or phone call that may be received by the mobile device via the Hoplon™ app. The first answering station device may then re-establish the connection with the mobile device.

Upon re-establishing the connection with the mobile device, the first answering station device may then send a message to the mobile device requesting updated position information for the mobile device. In response to receiving the message from the first answering station device, the mobile device may determine location information indicating the position of the mobile device. The mobile device may then send a message to the first answering station device that includes the determined location information. The location information may be specified in terms of longitude and latitude coordinates of the mobile device and may be provided in the form of GPS coordinates. Alternatively, the location information may be specified in terms of a street address (e.g., 324 West Street). Upon receipt of the location information, the first answering station device may store data representing the position information for the mobile device. The first answering station device may further send one or more messages to the mobile device periodically to request updated location information for the mobile device to enable tracking of the mobile device, as described in greater detail below.

In some embodiments, a third-party device (not shown) may access the answering server device 250 to establish a connection to the answering server device 250. For example, a third-party device may be a device used by a government, police, or military official. Such a third-party device may send information indicating the identified service coverage area associated with the answering server device 250. In this example, the identified service coverage area may be associated with a PSAP center. Safety unit(s) 254 may permit the establishment of a connection between the answering server device 250 and the third-party device.

In some embodiments, the answering server device 250 and/or a third-party device (e.g., a device used by a police officer) may send one or more selectable predetermined messages to the client device 210 in communication with (or, in some embodiments, to be queued for communication with) the answering server device 250 and/or the third-party device. A selectable predetermined message may alert the client device 210 and/or the other client device(s) (collectively referred to as "caller devices") that help is on the way (in response to a request for help) and that additional calls for help may be unnecessary. The one or more selectable predetermined messages may be sent in response to the selection of a selectable visual element included in a first display device of an answering station device 260 (e.g., a station device in a PSAP) or in a second display device of a third-party device (e.g., a police officer mobile device, a police station device, a dispatch center device, a first responder headquarter device, etc.).

In some embodiments, as the answering station device 260 or a third-party device determines that a threshold number of calls originate from a specific coverage area (e.g., a county, a school campus, or any geofenced region), the answering station device 260 and/or the third-party device may cause respective display devices thereof to present a visual element representative of the calls in a dedicated portion of a screen of the respective display devices. For instance, the visual element may be a graphical block (an icon, a window, or the like) labeled "Send Preset Message." Further, upon or after a threshold number of calls is received from the identified service coverage area, the answering station device 260 and the third-party device may cause respective display devices thereof to present one or more selectable visual elements representative of one or more respective selectable predetermined messages that may be sent to the caller devices. A selectable predetermined message may be sent by the answering station device 260 and the third-party device in response to the selection of a selectable visual element. The threshold number may be configured by an administrator of the answering server device 250. As mentioned above, a selectable predetermined message notifies all or at least some of the caller devices located within a service coverage area or in a vicinity of a defined location that help has been dispatched. In some aspects, the answering station device 260 and the third-party device may cause respective display devices thereof to present respective locations of all caller devices as calls from the caller devices are received.

Sending or otherwise supplying preset messages as described herein may permit or otherwise facilitate avoiding network congestion or other types of excessive network traffic (e.g., call congestion) when help is already on the way. As such, in one aspect, an answering station device 260 and/or a third-party device (e.g., a mobile device of an officer, a station device at a police department or first responders station, and the like) may allow an operator (a PSAP agent, a police office, a first responder) to focus on incoming calls for other emergencies that have not yet received any type of assistance.

Further or in other embodiments, upon or after the connection request 214 is received and/or established, at least one of the safety server device(s) 240 may generate a record of a location associated with the connection request 214. Sec, e.g., FIG. 2 and FIG. 26. As mentioned, such a location may be represented or otherwise indicated with the location information contained in the connection request 214. The location information may be embodied in or may include latitude and longitude coordinates. The generation of such a record may be referred to as the location being tagged and/or pinned. The at least one of the safety server device(s) 240 may send a copy of the record and/or the location information indicative of the location to the answering server device 250 and/or a third-party device (e.g., an officer device and/or a device in a police department including safety unit(s) 218). The answering server device 250 and the third-party device may retain the copy of the record and/or such location information, and/or may transfer the location information (e.g., latitude and longitude coordinates) to a mobile officer device and/or an emergency response unit. For example, in one embodiment, the answering server device 250 and the third-party device may present, in a display device, a selectable visual element indicative or representative of a location information transfer option. For instance, the selectable visual element may be embodied in a block labeled "Transfer and Go." In response to the selection (e.g., a click or tap on the selectable visual element) of the selectable visual element, the answering server device 250 and the third-party device may send the location information to the mobile officer device and/or an emergency response unit (e.g., an EMS communication device). In one embodiment, the location information may be sent in combination with navigation information (e.g., direction instructions) that may be displayed or otherwise presented at the mobile officer device and/or the emergency response unit. In one aspect, the navigation information also may include instruction(s) or directive(s) to cause the mobile officer device and/or the emergency response unit to present (visually and/or aurally) the navigation information. In the case of the mobile officer app, they may either hit the "go" option on their mobile device and use the same device as they are using for the officer app, or use the "transfer and go" option which will send the location and preloaded location to a dashboard of their vehicle. In some aspects, the vehicle in this embodiment may include a device that permits or otherwise facilitates receiving information directly from a mobile device. The device may be embodied in a radio unit (e.g., a unit similar to radio unit 320, depicted for example at least in FIG. 3) that permits point-to-point communication between a mobile device and the vehicle. In addition, the vehicle may include a display device, such as those included in an infotainment system. This functionality may permit or otherwise facilitate maintaining dispatchers and mobile responders on the same system, which may speed up time and/or need not require familiarization with multiple systems.

In addition or in some embodiments, a location of the client device 210 may be monitored over time. See, e.g., FIG. 2 and FIG. 26. To that end, a safety server device of the safety server device(s) 240 may receive location information periodically (or, in some embodiments, at scheduled or otherwise defined instants) from the client device 210 after a communication session has been established. To receive the location information, the safety server device may poll the client device 210 periodically at intervals $\Delta t$ (e.g., 500 ms, 1 s, 2 s, 3 s, 4 s, 5 s, 10 s, or the like) or at defined instants, requesting the client device 210 to provide the location information in response to the polling. The safety server device may send an instruction or directive to the client device 210 to send location information periodically or at defined instants (e.g., according to a schedule). Upon or after receiving a set of location information corresponding to a group of instants (e.g., one or more instants), such a safety server device may send (e.g., push) the set of location information automatically to a third-party device functionally coupled to the safety service platform 140. Therefore, the third-party device (e.g., a police officer device, a police department device, or the like) may automatically obtain location information of the client device 210 over time. In some implementations, the third-party device may present a map including temporal location information of the client device 210. The map may be updated (or, more colloquially, "refreshed") at intervals Δt or at other times. Such an update of location information of the client device 210 may permit or otherwise facilitate dispatch operators and/or officers in the field to track the location of the client device in a live scenario. For instance, in the case of a kidnapping, the emergency response authorities may track a mobile device (and, in some instances, an associated end-user) on the move.

As mentioned, a third-party device (e.g., a police officer device) may include the safety unit(s) 218. In some aspects, the safety unit(s) 218 may cause the third-party device to present selectable visual elements (e.g., a "message station" tab) that in response to selection (e.g., clicking or tapping) may cause the third-party device to permit or otherwise facilitate the transmission of text messages to another third-party device (e.g., a station device in a police department) or one of the answering station device(s) 260 within a coverage area (e.g., a geofenced zone) associated with the answering server device 250. As is illustrated in FIG. 26, a first one of the third-party device(s) 270 may send messages to a second one of the third-party device(s) 270. Each of the first one and second one of the third-party device(s) 270 may be functionally coupled to the safety service platform 140 and/or the answering server device 250 via one or more of the network (s) (wireless network(s), wireline network, a combination thereof, or the like) and link(s) 220d (wireline link(s) and/or wireline link(s)). Each of the first one and the second one of the third-party device(s) 270 may present, via respective display devices, respective selectable visual elements that, in response to selection, cause or otherwise initiate the messaging amongst such devices.

Such functionality may increase the case of communication between officers in the field and dispatch agents in a PSAP or dispatch operating center. In some embodiments, the exchange of messages between third-party devices or a third-party device and an answering station device may be permitted or otherwise facilitated by the safety service platform 140. Thus, in one aspect, the messaging may be more efficient than other types of messaging in conventional safety systems because the messaging may be consolidated in a single safety service platform rather than relying on various radio communications or a separate phone call.

FIG. 3 presents a block diagram 300 of an example of a client device 210 in accordance with one or more embodiments of the disclosure. As is illustrated, the client device 210 may include one or more audio input units 304 and one or more audio output units 308. As an illustration, the audio output unit(s) 308 may include speaker(s); digital-to-analog converters; volume control(s) and/or other audio controls, such as bass control, treble control, and the like; an on/off switch; a combination thereof; or the like. In addition or in another example, the audio input unit(s) 304 may include microphone(s), analog-to-digital converter(s), amplifier(s), filter(s), and/or other circuitry for processing of audio (e.g., equalizer(s)). The client device 210 also may include one or more input/output (I/O) interface units 310. In one aspect, the I/O interface unit(s) 310 may include a display unit 312. The display unit 312 may include, in some embodiments, a display device and operation circuitry for the operation of the display device. In one example, the display device may include a touch screen and, thus, the display unit 312 may include detection circuitry (not depicted) for the detection of physical interaction with the device, such as the application of a force (or pressure) on a surface of the touch screen.

The client device 210 also may include a location unit 314 that may generate location information, such as global positioning system (GPS) coordinates of the client device 210. To that end, the location unit 314 may be functionally coupled to a radio unit 320 that may receive timing messages from one or more satellites via respective deep-space links. The radio unit 320 may send the timing messages to the location unit 314. The location unit 314 may determine an estimate of a location of the client device 210 using at least the timing messages. It is noted that the disclosure is not limited to GPS coordinates and, in some embodiments, the location unit 314 may rely on other types of determinations to estimate a location of the client device. For instance, the location unit 314 may utilize or otherwise leverage triangulation of Wi-Fi signals (e.g., pilot signals) and/or cellular signals to determine an estimate of a location of the client device 210. Accordingly, as is illustrated in FIG. 3, the radio unit 320 may include one or more antennas 322 and a multi-mode communication processing unit 324 that may process multiple types of wireless signals received by at least one of the antenna(s) 322.

As is further illustrated in FIG. 3, the client device 210 also may include one or more memory devices 315 (collectively referred to as memory 315). The memory 315 may include one or more safety components 316 and safety information 318. In some embodiments, the safety component(s) 316 may be embodied in or may constitute computer-accessible instructions (e.g., computer-readable and/or computer-executable instructions) that, in response to execution by a processor circuit, the computer-accessible instructions may cause the client device 210 to operate in accordance with aspects of this disclosure. In some embodiments, one or more processors 330 included in the client device 210 may execute the safety component(s) 316. The safety information 318 may be utilized during the operation of the client device 210 and may include, for example, location information generated by the location unit 314.

In some embodiments, as is illustrated in FIG. 4, the safety component(s) 316 may include a user-device interaction component 410 that may cause the client device 210 to present a user interface (UI) that permits or otherwise facilitates the utilization of the safety functionality in accordance with the disclosure. For instance, the user-device interaction component 410 may cause a display device of the display unit 312 to present selectable visual elements and/or non-selectable visual elements that constitute the user interface. In some embodiments, information indicative of respective formats (e.g., shape, size, font type, font size, etc.) and placements within the UI of the selectable visual elements and the non-selectable visual elements may be retained within the safety information 318 (see FIG. 3). An example of a UI 500 is shown in FIG. 5. The UI 500 includes a first selectable visual element 510 that, in response to being selected, may permit entering a username associated with a user account for a safety service that may provide the safety functionality of this disclosure. The UI 500 also includes a second selectable visual element 520 that, in response to being selected, may permit entering a password (or, in some embodiments, other types of security credentials) that may secure such an account. The UI 500 further includes a second selectable visual element 530 that, in response to being selected, may permit accessing the safety service that provides the safety functionality described herein.

In some embodiments, in response to (e.g., after or upon) an account associated with the safety service of this disclosure being accessed, the user-device interaction component

410 may cause the client device 210 illustrated in FIG. 3 to present a UI that may permit requesting a defined type of communication with a destination device (e.g., one of the answering station device(s) 260). Thus, in one embodiment, the user-device interaction component 410 may cause the display device included in the display unit 312 (see FIG. 3) to present selectable visual elements representative of respective options for communication. As an illustration, FIG. 6 presents an example of a UI 600 that includes a first selectable visual element 610 for a first type of communication; a second selectable visual element 620 for a second type of communication; and a third selectable visual element for a third type of communication.

Selection of one of the first selectable visual element 610, the second selectable visual element 620, or the third selectable visual element 630 may cause the client device 210 to generate a connection request (see, e.g., connection request 214 in FIG. 2). To that end, with further reference to FIG. 4, a request composition component 430 may generate a connection request that includes location information indicative of a location of the client device 210. In one embodiment, the location information may be indicative of GPS coordinates and may be received from the safety information 318. In addition or in other embodiments, the request composition component 430 may query the location unit 314 for location information (e.g., GPS coordinates or other types of coordinates). In addition, a communication component 420 may configure (e.g., format) the connection request according to a defined protocol for communication with a remote device (e.g., a server device of the safety service platform 140). In one example, the defined protocol for communication may include one of Hyper Text Transfer Protocol Secure (HTTPS) or Session Initiation Protocol (SIP). The disclosure is not limited in that respect and other communication protocols may be contemplated. In some embodiments, the communication component 420 may direct the radio unit 320 to send the connection request to the remote device.

Figure 7:
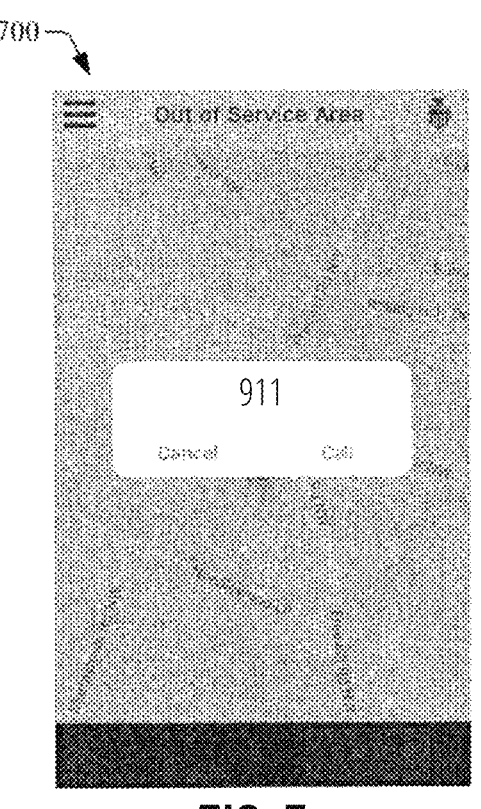

In scenarios in which the client device 210 is located outside a coverage area, the communication component 420 may receive a denial response message indicative of a denial of the connection request sent by the client device 210. The denial response message may be embodied in, for example, an HTTPS message. In one embodiment, the response message may be received by the radio unit 320 and may be sent (or otherwise made available) to the communication component 420. As discussed herein, in some embodiments, in response to the denial response message, the client device 210 may instruct the dialing of 911. To that end, the user-device interaction component 410 may cause a display device within the display unit 312 to present a visual element (selectable or otherwise) that instructs the dialing of 911. In addition or in the alternative, the user-device interaction component 410 may cause such a display device to present a selectable visual element that in response to (e.g., after or upon) being selected may cause the client device 210 to dial 911. FIG. 7 illustrates an example of a UI 700 that may be presented at the client device 210 during the establishment of the connection with an answering station device (e.g., one of the answering station device(s) 260).

Figure 8:
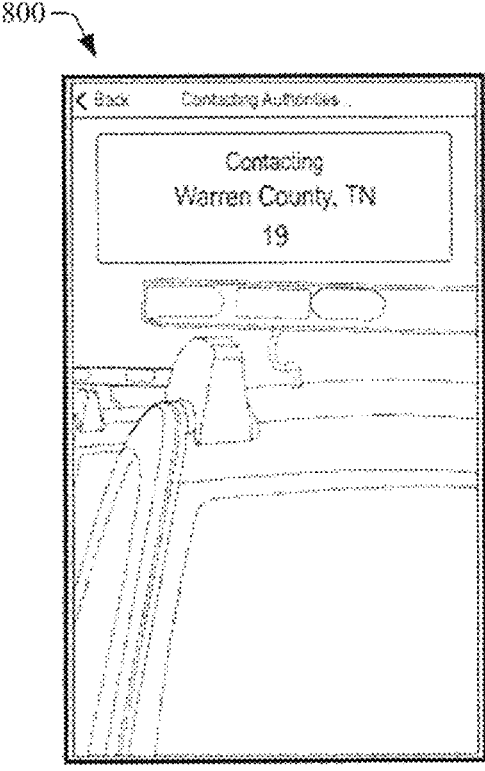

In scenarios in which the client device 210 is located inside a coverage area, the communication component 420 may receive a connect response message that includes information indicative of a communication address (e.g., an IP address) of the answering server device 250 (see FIG. 2). The connect response message may be embodied in, for example, an HTTPS message. In one embodiment, the response message may be received by the radio unit 320 and may be sent (or otherwise made available) to the communication component 420. As discussed herein, in some embodiments, in response to the connect response message, the client device 210 may connect to the answering server device 250. To that end, client device 210 may exchange, via the communication component 420 and the radio unit 320, for example, one or more messages with the answering service device 250. In addition, the user-device interaction component 410 may cause a display device of the display unit 312 to present visual elements (selectable or otherwise) that may inform that a connection is being established. FIG. 8 illustrates an example of a UI 800 that may be presented at the client device 210 during the establishment of the connection with an answering station device (e.g., one of the answering station device(s) 260).

After or upon a communication session has been established with an answering station device (e.g., one of the answering station device(s) 260), the user-device interaction component 410 may cause a display device of the display unit 312 of the client device 210 (see, e.g., FIG. 3) to present visual elements (selectable or otherwise) that may inform that the communication session has been established or is otherwise in progress. As mentioned, a communication session may be embodied in or may include, for example, one of a voice call, a chat session, or a video chat session. FIG. 9 illustrates an example of a UI 900 that may be presented at a client device (e.g., client device 210) upon or after a voice call has been established between a client device and an answering station device (e.g., one of the answering station device(s) 260), for example. FIG. 10 illustrates an example of a UI 1000 that may be presented at the client device upon or after a chat session has been established between the client device and the answering station device, for example.

With further reference to FIG. 5, the UI 500 may include a selectable visual element 540 that, in response to selection, may cause a client device (e.g., mobile telephone 110, client device 210, or the like) to collect information to configure an account associated with an end-user associated with the client device.

In some embodiments, a unique safe keyword and/or safe key-phrase may be generated and retained in a user profile associated with a user of a client device (e.g., mobile telephone 110 or client device 210). A safe keyword may be embodied in a defined word, and a safe key-phrase may be embodied in or may include a combination of defined words that may have a defined meaning in natural language or a particular meaning to an end-user that configures the safe key-phrase. In some implementations, the safe key-phrase may include a combination of words that would not typically occur in everyday speech) that activates a safety service in accordance with this disclosure.

Each one of a safe keyword or a safe key-phrase may activate safety functionality in the client device (e.g., a mobile device), the safety functionality including at least some of the functionality described herein. To that end, safety units (e.g., safety unit(s) 218) within the client device may include a keyword spotting component. As is illustrated in FIG. 11, in some embodiments, the safety component(s) 316 of the client device 210 may include a keyword spotting component 1110. In response to the execution of the safety component(s), the keyword spotting component 1110 may detect the safe keyword or the safe key-phrase. To that end, in some aspects, external audio signals may be received from a first audio input unit (e.g., a microphone) of the audio input unit(s) 304, and the keyword spotting component 1110 may analyze the external audio signals. In one example, the keyword spotting component 1110 may apply a keyword model to the external audio signal to determine either the presence or absence of the safe keyword and/or the safe key-phrase. The keyword model (e.g., a hidden Markov model (HMM) and/or a Gaussian mixture model) is directed to representing one or more predetermined keywords, such as "Need safety," and providing a probability of the safe keyword and/or safe key-phrase be included in an audible signal received by one or more of the more audio input units 304.

In response to a determination that a portion of the external audio signals include the safe keyword and/or the safe key-phrase, the user-device interaction component 410 may cause the client device 210 to present the UI 600 illustrated in FIG. 6 to permit communicating with an answering station device in accordance with aspects of this disclosure.

In embodiments in which the I/O interface(s) 310 include a camera, in response to the safe keyword or the safe key-phrase being uttered, the client device 210 (e.g., a mobile device) may turn on or otherwise energize a camera to collect images (e.g., still pictures and/or a video segment) of the environment surrounding the client device 210. Information representative of the images may be retained in the memory 315. In addition or in other embodiments, external audio signals may be retained in the memory 315 and/or a recording device included in the client 210. The recording device may be energized in response to keyword spotting component 1110 determining that the safe keyword and/or the safe key-phrase has been uttered. In one embodiment, the mobile device may send audio signals indicative of external audio collected by the client device 210 to an answering station device (e.g., one of the answering station device(s) 260). In addition or in another embodiment, the client device 210 may send video signals representative of the images collected by the camera.

In addition to sending audio signals and/or video signals, in some embodiments, the client device 210 (e.g., a mobile device) may send location information indicative of a location of the client device 210. The location may be silently tagged and pinned. In one aspect, as discussed, the client device 210 may send information indicative of the location to an answering station device. For instance, the client device 210 may send a message including information indicative of the GPS coordinates of the device to a communication address (e.g., an IP address, such as an IPV6 address) of the answering station device. The audio signals and/or the video signals may be retained in a repository included in or functionally coupled to the answering station device. In some instances, authorities may listen in and view the situation, determining whether or not help is necessary.

In some embodiments, a client device 210 configured with safety components in accordance with aspects of the disclosure may respond to violent movement and/or force exerted on the client device 210, such as the movement or force that the client device 210 may experience in numerous distress events, such as a car accident, physical assault, fall, and gunshot, or an attack of some kind, among other events. FIG. 12 presents an example of the client device 210 that may respond to such events in accordance with one or more embodiments of the disclosure. The client device 210 may include an accelerometer unit 1210 that may include a solid-state accelerometer and circuitry that may permit or otherwise facilitate providing signals representative of acceleration (e.g., a nearly instantaneous acceleration) of the client device 210. The signals may represent an acceleration vector $a=(a_x, a_y, a_z)$ in a device frame of reference. The safety components 316 in the client device 210 may include an accelerator monitor component 1220 that may acquire (e.g., collect or receive) and may monitor a time dependency of at least a portion of the signals representative of the acceleration of the client device 210. Stated differently, the accelerator monitor component 1220 may determine changes to the direction and/or magnitude of the acceleration vector over time. In addition, the safety information 318 may include one or more rules 1230 that the acceleration monitor component 120 and/or another one of the safety component(s) 316 may apply to acceleration signals that are monitored.

FIG. 13 illustrates the safety component(s) 316 in which a distress event may initiate a communication between the client device 210 illustrated in FIG. 12 and an answering station device (e.g., one of the answering station devices 260). Similar to other client devices, the user-device interaction component 1310 may cause the client device 210 to present a UI that includes selectable visual elements that may permit or otherwise facilitate accessing the safety functionality in accordance with the disclosure. As an example, the user-device interaction component 1310 may cause a display device of the display unit 312 to present the UI 1400 as is illustrated in FIG. 14. The UI 1400 includes a first selectable visual element 1410 that, in response to selection thereof may cause such a display device to present another UI that is similar to (or, in some embodiments, the same as) the UI 600 shown in FIG. 6. Selection of the first selectable visual element 1410 may be achieved, for example, via a physical interaction with a portion of a touch screen corresponding to an area of the element 1410.

As is illustrated in FIG. 14, the UI 1400 also may include a second selectable visual element 1420 that, in response to selection thereof, may cause the acceleration monitor component 1220 to initiate the collection of information representative of or otherwise indicative of acceleration of the client device 210 (e.g., a mobile device). Thus, in one example, the acceleration monitor component 1220 may turn on or otherwise energize an accelerometer device or accelerometer circuitry associated therewith within the accelerometer unit to provide acceleration signals representative of an acceleration of the client device 210. In addition or in some embodiments, the acceleration monitor component 1220 may collect acceleration signals representative of or otherwise indicative of the acceleration of computing device 210. In some embodiments, the acceleration monitor component 1220 may collect the acceleration signals at defined time intervals. For instance, the acceleration monitor component 1220 may collect the acceleration signals at a defined rate. In one aspect, the acceleration monitor component 1220 may query the accelerometer device at a defined rate and, in response, may receive signals representative of an acceleration vector $a=(a_x, a_y, a_z)$ in a device frame of reference at a defined instant. In some embodiments, the defined rate may be one of about 100 Hz or about 60 Hz.

In addition, the acceleration monitor component 1220 may apply a distress rule to a portion of acceleration information retained or otherwise available within the safety information 1218. A result or an outcome of the application of the distress rule may determine if a distress event has occurred. In some embodiments, the rule may dictate the computation of a magnitude of a difference between a current acceleration vector and a gravity vector, and the comparison of the difference with a defined threshold. As such, in some scenarios, the acceleration monitor component 1220 may determine that a distress event is absent using at least a portion of the acceleration information. Specifically, the application of the distress rule may result in the magnitude of such a difference being less than the threshold. In one of such scenarios, the monitoring of the acceleration information may continue. In other scenarios, the acceleration monitor component 1220 may determine that a distress event has occurred using at least a portion of the acceleration information. In particular, the application of the distress rule may result in the magnitude of such a difference being greater than the defined threshold.

In response to (e.g., after or upon) a determination that the distress event has occurred, the user-device interaction component 1310 may validate the occurrence of the distress event. To that end, the user-device interaction component 1310 may cause the client device 210 to prompt confirmation of the distress occurrence of the distress event. In some instances, the user-device interaction component 1310 may receive input information that confirms the occurrence of the distress event. In other instances, the user-device interaction component 1310 may determine that the prompt has timed out, e.g., that a response to the prompt is absent after or by the time a defined time interval has elapsed, and may cause the client device 210 to perform one or more default operations. In some embodiments, the default operation(s) may include initiating a communication with a safety service platform, in accordance with aspects described herein. In addition or in other embodiments, the default operation(s) may include communicating with an emergency contact configured for the client device 210 in accordance with the aspects described herein. The distress rule(s) 1230 may determine or otherwise dictate the default operation(s). The safety information 1218 may include emergency contact(s) information.

Upon or after the distress event is confirmed, the user-device interaction component 1310 may cause the client device 210 to activate a camera and recording device, and/or to tag the location of the client device 210. In addition, a communication session between the client device 210 and an answering station device (e.g., one of the answering station device(s) 260) may be initiated in accordance with aspects of this disclosure. The communication session may permit sending audio signals and/or video signals to the answering station device, which device may be located in a dispatch center, and/or a third-party device. The answering station device and/or the third-party device may present the received audio signals and/or video signals. The specific content of the presented signals may permit or otherwise facilitate determining that help is necessary.

Numerous other responses to a distress event may be implemented by the client device 210. Specifically, in some embodiments, the client device 210 may initiate a communication with a safety service platform and/or a third-party device and may obfuscate a screen of a display device of the client device 210 in response to a distress event. The obfuscated screen caused the client device 210 (e.g., a mobile phone) to appear inactive, without any screen activity. See, e.g., FIG. 27C. As mentioned, the third-party device may be embodied in or may include a police officer mobile device, a police station device, a dispatch center device, a first responder headquarters device, and the like. The order in which the communication is initiated and the screen is obfuscated may be configurable, with obfuscation preceding the initiation of the communication or vice versa. As part of the communication, the client device 210 may provide audio signals and/or video signals to an answering station device and/or the third-party device while the screen is obfuscated. Such obfuscated mode of operation (which may be informally referred to as "stealth mode") may permit responding to a distress event or any other type of emergency inconspicuously. Thus, providing an increased layer of safety for the end-user of the client device 210 because it may prevent an attacker or assailant from noticing an active distress call initiated by a victim.

It is noted that in some embodiments, the obfuscated mode of operation described herein may be implemented by a client device (e.g., client device 210 as shown in FIG. 12) in response to the selection of a selectable visual element presented in a display device of the client device 210. As is illustrated in the example UI in FIG. 27B may be embodied in a selectable block with a defined label (e.g., "S" or "Stealth"). The UI in FIG. 27B may be presented by the client device 210 in response to the selection of a selectable visual element presented in a previously displayed UI, such as the UI in FIG. 27A. For example, the selection of a selectable visual element, e.g., the "Distress" block may cause the client device to present the UI illustrated in FIG. 27B. Similar to other types of selection of selectable visual elements described herein, the selectable visual element may be selected by tapping or swiping (represented with three arrows) on a portion of a touch-screen of the display device; by hovering indicia over the selectable visual element, or by clicking on the selectable visual element. The selectable visual element may be included in a user interface (such as UI 600 in FIG. 6) that is presented as part of the safety functionality of the client device in accordance with the aspects described herein. For instance, such a selectable visual element may be embodied in an icon or block that may be swiped and/or tapped.

In addition or as an alternative to other responses described herein, in embodiments in which the client device 210 is embodied in or includes a wearable device (such as a smartwatch) that may monitor or otherwise collect biometric data from an end-user. A biometric monitor unit (not depicted in FIG. 12) may generate the biometric data. In such embodiments, the client device 210 may respond to a distress event by initiating a communication with a safety service platform 140 and/or a third-party device functionally coupled to the safety service platform 140, and sending biometric data to the safety service platform 140 and/or the third-party device. The biometric data may be sent within the communication (e.g., a voice call or a text message) and may include, for example, heartbeat readings, blood pressure readings, blood glucose readings, a combination thereof, or the like. In some instances, the client device 210 may be configured to monitor a particular biometric quantity that is specific to an end-user of the client device 210. The type of the biometric data to be sent in response to a distress event may be configured in a user profile, which profile may be configured via a user interface, such as UI 2200 in FIG. 22, as is described herein. An answering station device (e.g., one of the answering station device(s) 260) may present (e.g., display or announce) at least a portion of the received biometric data in response to the communication being established. For instance, a heartbeat in BPMs may be presented. As such, in some aspects, first responders may have access to a caller's heartbeat and/or other type of biometric data, gaining insight into the severity of the distress event or determining that a false positive distress event occurred.

In some embodiments, a client device in accordance with aspects of this disclosure may permit or otherwise facilitate other types of interaction with an end-user. As an illustration the client device 210 in accordance with embodiments disclosed herein (see, e.g., FIG. 3 and FIG. 12) may provide alert message(s) received from the safety service platform 140. To that end, in some aspects, the client device may present a user interface that includes a selectable visual element (e.g., a selectable tab) that, in response to selection, may present a list or another structure including a group of alert messages. In one example, as is illustrated in FIG. 29A, the selectable visual element may be a block labeled "!". In response to the selection of such a selectable visual element, the client device 210 may present another UI including another selectable visual element (e.g., selectable block "Alert Messages" in a UI as is shown in FIG. 29B) that may be selected to cause the client device 210 to present content associated with an alert. Such alerts may be displayed in a UI presented in the client device 210. As is illustrated in FIG. 29C, the UI may present contents associated with respective alerts. The contents may be browsed via a scroll-down fashion (represented with an arrow) or any other type of browsing mechanisms. Content of an alert message may include text (which may include links to external websites or other sources); photos; videos; and/or other types of digital media.

Alert messages may be generated by a device of an organization (school, city, county, etc.) that utilizes or otherwise relies on the systems, devices, and apparatus for emergency responses as described herein. Such systems, devices, and/or apparatuses may push or otherwise send an alert to the client device 210. In one embodiment, the chosen administrator may log on a server device of the safety server device(s) 240, for example, using their unique credentials, and may cause the server device of another server device of the safety server device(s) 240 to send an alert message to a client device (e.g., the client device 210) specifically within the coverage area (e.g., a defined geofence) in which the client device 210 is located.

The alert messages in accordance with aspects of this disclosure may be combined with any of the other functionalities for emergency responses in accordance with aspects described herein. Such alert messages may be specific to a geographic region (e.g., a coverage area) and may contain information pertinent to an organization in the geographic region. In addition or in some embodiments, an alert system (e.g., one or more of the safety server device(s) 240 and a portion of the system repository 245) may notify an end-user of disturbances within a specific area, thus increasing awareness and security. The alert messages may be updated and/or modified, by the alert system, for example, at any time to reflect a threat that may be moving or is suspected to be distributed across multiple coverage areas (e.g., several defined geofences).

Further or in other embodiments, as an illustration, the client device 210 in accordance with embodiments disclosed herein (see, e.g., FIG. 3 and FIG. 12) may provide helpline resources (e.g., digital content, access to a support operator, etc.) that may specific to a coverage area (e.g., a defined geofence) or universal to an end-user of the client device regardless of coverage area. Such resources may be managed and/or provided via a partnership with an operator and/or administrator of a safety service platform of this disclosure (such as safety service platform 140). As an illustration, in one embodiment, the client device may present, via a display device, a user profile menu that includes a selectable visual element associated with defined helpline resource(s) (e.g., a selectable block or tab labeled "Helpline Resources;" see, e.g., FIG. 30A). In response to (e.g., upon or after) selection of such a selectable visual element, the client device 210 may present, via the display device, local and/or regional "helplines" that may be specific to a coverage area. Presentation of a helpline resource may include visual elements (selectable or otherwise) indicative of a resource partner name, telephone number, website, and/or address (or another type of location). See, e.g., FIG. 30B. The coverage area, in one aspect, may be associated with a current location of the client device 210. Such a location may be determined, for example, by means of the location unit 314 in the client device 210. Such "helplines" may not involve traditional emergency services. Examples of helplines may include numerous support groups, such as sexual abuse centers, addiction treatment centers, homeless shelters, and the line. A "helpline" that is presented via the display device may have associated selectable visual element(s) that, in response to selection, permit establishing a communication with an operator device of a helpline center. The selectable visual element(s) may permit initiating a voice call, sending an email, sending a text message (e.g., an SMS or MMS message), a combination of the foregoing, or the like. See, e.g., elements "Call" in FIG. 30B. In addition or in some embodiments, one or more of such visual elements may be representative of an address and, in response to the selection of the address of a specific resource, the client device 210 may initiate or otherwise activate (e.g., execute) a navigation system on the client device 210, which may direct an end-user to the address in case driving or otherwise visiting a facility associated with the helpline is desired. See, e.g., elements "Directions" in FIG. 30B.

Providing access to helpline resources may further provide self-contained mechanisms for safety responses in the systems, devices, and apparatus for safety responses of this disclosure. In addition, providing access to helpline resources permit or otherwise facilitate a client device in accordance with this disclosure to initiate communication and/or to communicate with help locally without reliance on external systems (such as external websites).

In addition or in other embodiments, as an illustration, the client device 210 in accordance with embodiments disclosed herein (see, e.g., FIG. 3 and FIG. 12) may permit or otherwise facilitate messaging emergency contacts. Thus, in some embodiments, the client device 210 may cause a display device to present a selectable visual element that, in response to selection, may cause the client device 210 to prompt entry of input information indicative or otherwise representative of one or more emergency contacts. For example, as is illustrated in FIG. 28A and FIG. 28B, the selectable visual element may be labeled "Emergency Contacts." For another example, the selection of "Emergency Contacts" on a UI may cause the client device 210 to present another UI that includes another selectable visual element, e.g., an "ADD" element, that in response to the selection prompt entry of an emergency contact. Other functionality also may be accessed from the UI that includes the "ADD" selectable visual element. See, e.g., FIG. 28B. In one embodiment, the client device 210 may prompt entry of such information in response to activation or execution safety component(s) 316 stored in the client device. In response to a prompt for entry of an emergency contact, the client device 210 may receive input information indicative or otherwise representative of a name, a telephone number, and/or an email address. The client device 210 may receive information indicative or otherwise representative of several emergency contacts (e.g., names, telephone numbers, and/or email addresses). In response to activation of a specific type of communication (and associated communication request and communication session), such as type, speak, walk me home (see, e.g., FIG. 6), a text message may be sent to one or more of the emergency contacts that are configured. The text message may be sent in conjunction with the location of the client device at the time of an incident that caused the activation of the specific type of communication. In one embodiment, such a functionality directed to the communication of a text message may be activated or toggled on in response to the selection of a selectable visual element in a profile setting. The selectable visual element may be embodied in or may include a bar that may slid, the bar labeled "text emergency contacts," for example.

Messaging an emergency contact may keep specific user devices and associated end-users apprised of a condition of an end-user of the client device 210 that initiates the messaging. In addition, the transmission of the location of the client device within the messaging may increase the situational awareness of a recipient of the messages.

In some embodiments, additional selectable visual elements may be added to contact groups of client devices 210, where the groups may include people associated with a particular function. For instance, in a school environment, the safety components 316 on the client devices 210 may be configured for teachers with a selectable visual element to summon the nursing team for an injury, a second selectable visual element to summon a school resource officer to help with safety issues, and a third selectable visual element for behavioral issues to summon one or more members of the principal's staff. As mentioned above, these selectable visual elements may be set to work only within the coverage area 120. When these selectable visual elements are selected, the alert messages will be sent to the group of client devices 210 in some embodiments, or to a specific client device 210 in possession of the person "on call" for that type of situation. The person "on call" could be configured at the safety service platform 140, and may rotate to different people, may be permanently assigned to one person, may be sent simultaneously to the group, or may follow a list of primary and alternate responsible people, depending on who is within the Defined area of coverage 3102 (depicted at least by FIG. 31).

Figure 15:
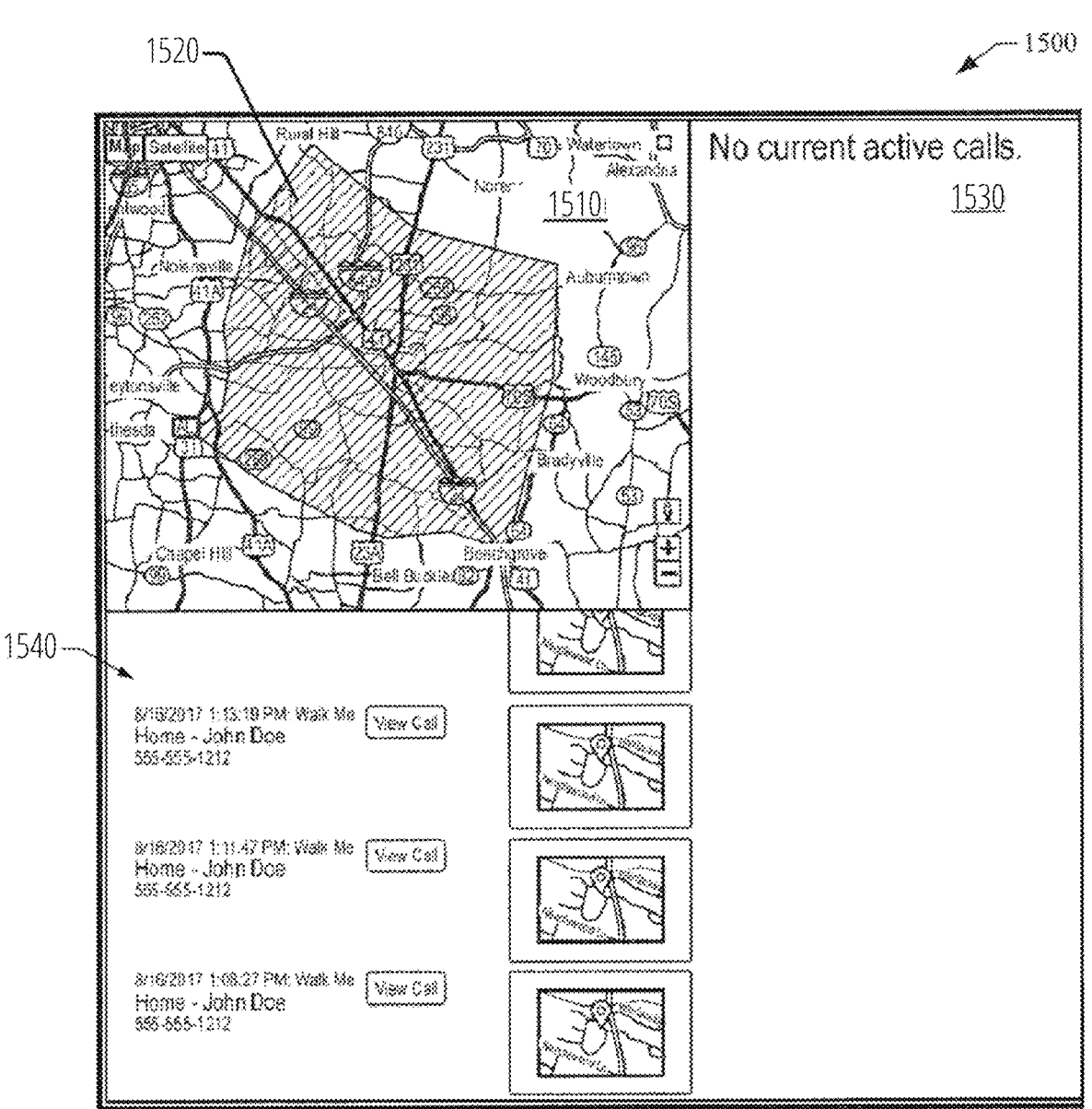

As described herein, an answering station device (e.g., one of the answering station device(s) 260) also may include one or more safety components that may provide safety functionality in accordance with aspects of this disclosure. In some embodiments, such safety component(s) may include a user-device interaction component that may cause a display device of the answering station device to present visual elements (selectable or otherwise) that may permit or otherwise facilitate accessing at least some of the safety functionality. In some aspects, in the absence of a session communication (e.g., a voice call, a video call, or a chat session), the user-interaction component may cause the display device to present a UI 1500 as is illustrated in FIG. 15. The UI 1500 may embody or may constitute a dashboard interface that may permit or otherwise facilitate an operator of the answering station device to access some of the safety functionality. The UI 1500 may include a visual element 1510 (selectable or otherwise) that may present a map of an area that includes a coverage area 1520 associated with the answering station device. The coverage area 1520 may embody, in one example, the coverage area 120 shown in FIG. 1. The UI 1500 also includes a section 1530 that may include a visual element indicating the absence of active calls. In addition, the UI 1500 may include multiple visual elements 1540 indicative of a communication session history of the answering station device that presents the UI 1500. The multiple visual elements 1540 may include first visual elements indicative of respective time stamps (e.g., respective days and times) of communication sessions in the history. The multiple visual elements 1540 also may include second visual elements (selectable or otherwise) indicative of respective locations associated with the communication sessions in the history. Each of the second visual elements may include a portion of a map in a vicinity of a location of a client device (such as the client device 210 (e.g., a mobile telephone, a smartwatch, a tablet computer, etc.)) that originated a communication session in the history. Further, the multiple visual elements 1540 may include third selectable visual elements (represented with a box labeled "View Call") that, in response to selection, may cause the answering station device to present a record of the session content exchanged between the client device and the answering station device.

Figure 16:
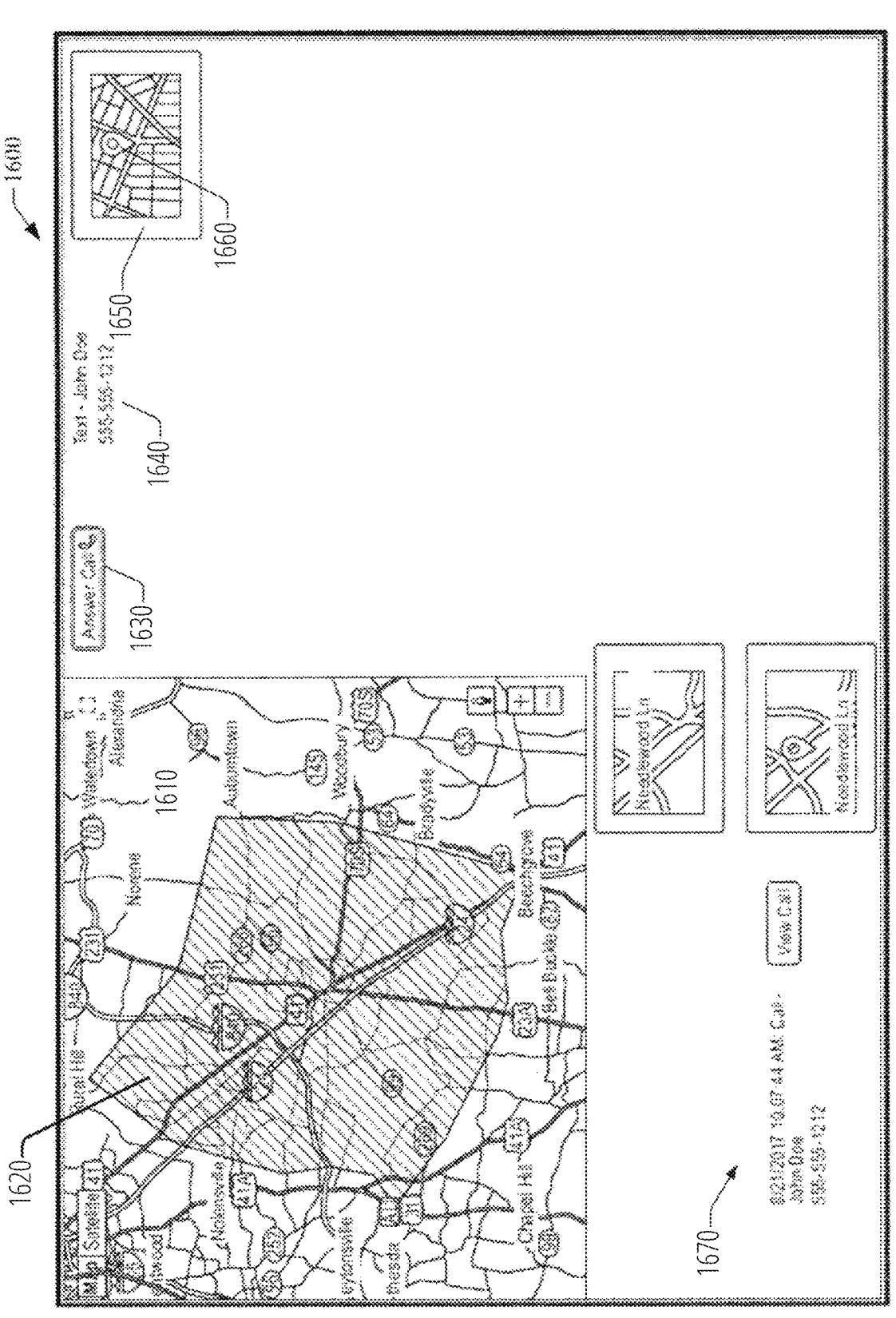

In response to (e.g., upon or after) a communication session being established between a client device and an answering station device, a user-device interaction component included in the answering station device may cause a display device of the answering station device to present a UI 1600 as is illustrated in FIG. 16. Similar to UI 1500, the UI 1600 may embody or may constitute a dashboard interface that may permit or otherwise facilitate an operator of the answering station device to access some of the safety functionality. The UI 1600 may include visual elements 1610 (selectable or otherwise) that may present a map of an area that includes a coverage area 1620 associated with the answering station device. The coverage area 1620 may embody, in one example, the coverage area 120 shown in FIG. 1. The UI 1600 also includes a section that may include a first selectable visual element 1630 that, in response to selection, may cause the answering station device to answer a communication, thus initiating the exchange of session content between the client device 210 and the answering station device. In addition, the UI 1600 may include a second selectable visual element that may initiate a chat session between the client device 210 and the answering station device. The selectable visual element 1640 may include, for example, markings indicative of the telephone number associated with the client device 210. Further, the UI 1600 may include a visual element 1650 representative of a portion of the map in a vicinity of the location of the client device 210, the portion of the map including the location of the client device 210. The visual element 1650 may include a visual element 1660 indicative of the location of the client device in the portion of the map. In some embodiments, at least a portion of the visual element 1650 may be selectable. In response to selection, the portion of the map may be modified to zoom into a neighboring portion of the location of the client device 210 or to zoom out from the neighboring portion of the location of the client device 210.

Similar to the UI 1500, the UI 1600 may include multiple visual elements 1670 indicative of at least a portion of a communication session history of the answering station device that presents the UI 1600. The multiple visual elements 1670 may include first visual elements indicative of a timestamp (e.g., a day and time) of a communication session in the history. The multiple visual elements 1670 also may include second visual elements (selectable or otherwise) indicative of a location associated with the communication session in the history. The second visual element may include a portion of a map in a vicinity of the location of the client device (such as the client device 210 (e.g., a mobile telephone, a smartwatch, a tablet computer, etc.)) that originated the communication session in the history. Further, the multiple visual elements 1670 may include third selectable visual elements (represented with a box labeled "View Call") that, in response to selection, may cause the answering station device to present a record of the session content exchanged between the client device 210 and the answering station device.

Figure 17:
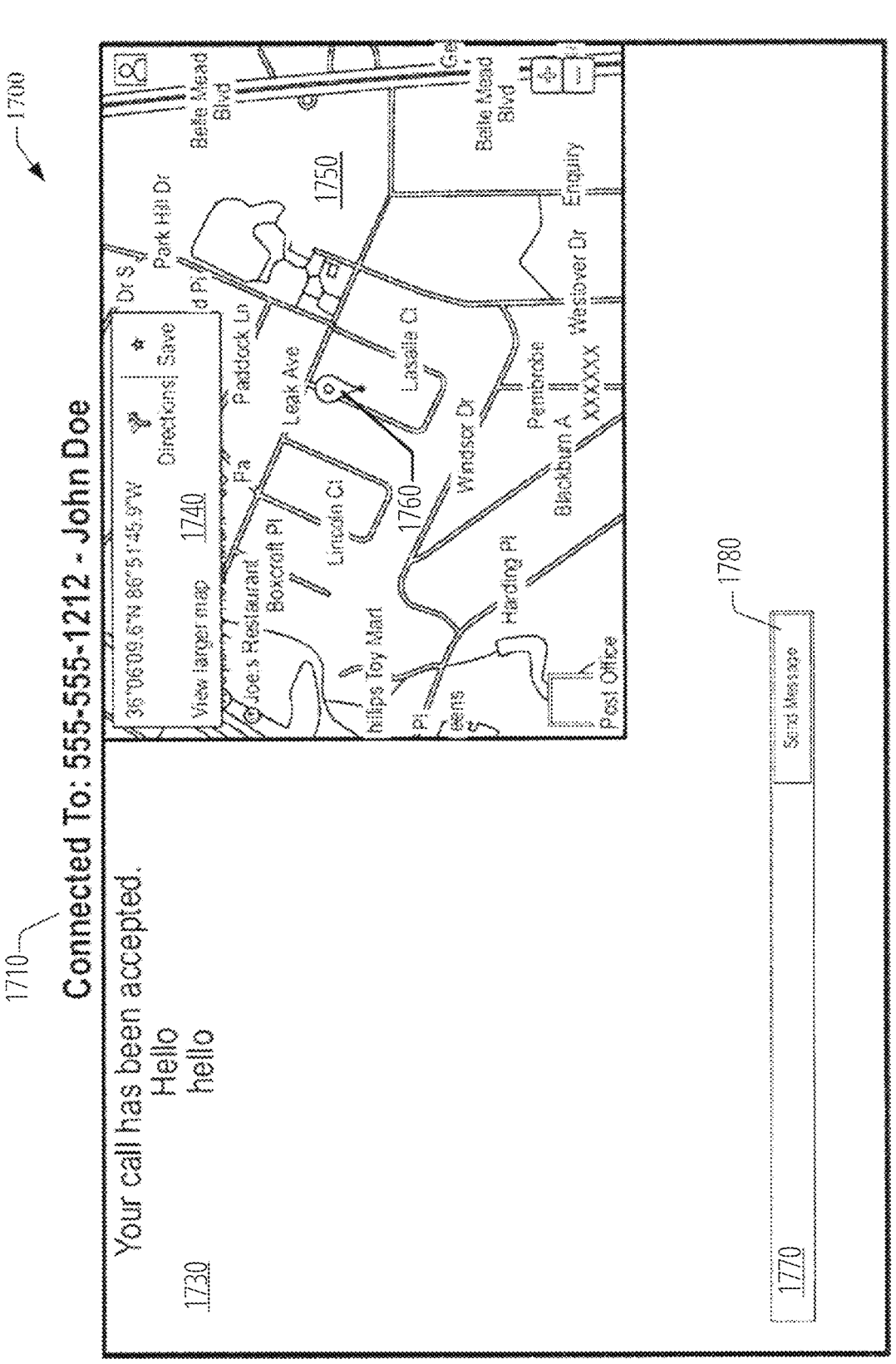

In some embodiments, in response to (e.g., upon or after) establishing a chat session between an answering station device and a client device 210, a user-device interaction component within the answering station device may cause a display of the answering station device to present a UI 1700 as is illustrated in FIG. 17. The UI 1700 may include a visual element 1710 indicative of a telephone number (or, in some embodiments, another type of communication address) and a name of an end-user associated with the telephone number. Similar to other UIs presented by an answering station device in accordance with aspect of this disclosure, the UI 1700 may include a section 1750 including visual elements representative of a map that includes the location of the client device. A visual element 1760 may represent such a location within the map. The UI 1700 also may include a second section 1740 that includes visual elements indicative of coordinates (e.g., latitude and longitude) of the location of the client device. The second section 1740 also may include selectable visual elements that, in response to selection, permit or otherwise facilitate modifying the map shown in the section 1750.

Further, as is illustrated in FIG. 17, the UI 1700 includes a section 1730 that includes visual elements indicative of the chat session between the answering station device that presents the UI 1700 and a client device 210. A selectable visual element 1770 may permit inputting a message, including text and/or symbols, that may be sent to the client device 210. To that end, the UI 1700 includes a selectable element 1780 that, in response to selection, may cause the answering station device to send the message inputted in the selectable visual element 1770.

Figure 18:
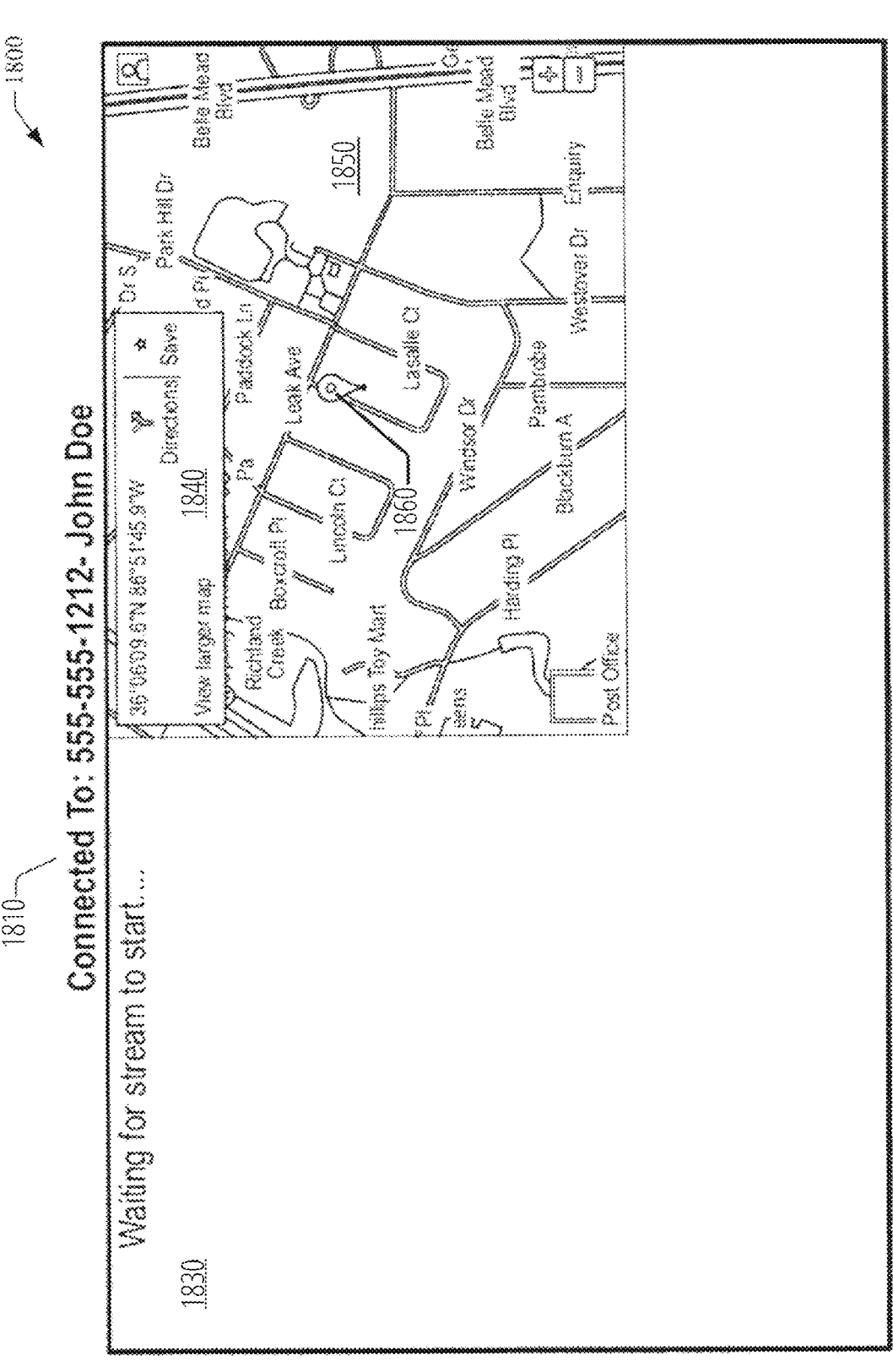

In addition or in other embodiments, in response to (e.g., upon or after) establishing a video call session between an answering station device and a client device 210, a user-device interaction component within the answering station device may cause a display device of the answering station device to present a UI 1800 as is illustrated in FIG. 18. The UI 1800 may include a visual element 1810 indicative of a telephone number (or, in some embodiments, another type of communication address) and a name of an end-user associated with the telephone number. Similar to other UIs presented by an answering station device in accordance with an aspect of this disclosure, the UI 1800 may include a section 1850 including visual elements representative of a map that includes the location of the client device 210. A visual element 1860 may represent such a location within the map. The UI 1800 also may include a second section 1840 that includes visual elements indicative of coordinates (e.g., latitude and longitude) of the location of the client device 210. The second section 1840 also may include selectable visual elements that, in response to selection, permit or otherwise facilitate modifying the map shown in the section 1850. The UI 1800 also may include a section 1830 on which session content conveyed by video signals received from the client device 210 may be presented.

As mentioned, a third-party device (e.g., a police officer device, a firefighter device, a paramedic device, and the like) also may be configured to include one or more safety components that may provide or otherwise facilitate the safety functionality of this disclosure. As an example, FIG. 19 presents a UI 1900 that may be present in a third-party device in accordance with aspects of this disclosure. In one aspect, a user-device interaction component may cause the third-party device to present the UI interface 1900 before any communication sessions have been established between the third-party device and a client device 210.

In some embodiments, a communication session may be established between a client device (e.g., client device 210) and a third-party device, via an answering server device (e.g., answering server device 250) and/or via another type of device functionally coupled to the safety service platform 140. For example, such a communication session may be established in response to the selection of a selectable visual element for a video call (e.g., selectable visual element 630 may be selected) an audio call, or a call having audiovisual elements. Such a selectable visual element may be presented (e.g., displayed) by the client device in response to the selection of another visual element presented in a main user interface (e.g., selectable element "Signals" in FIG. 22). The third-party device may be embodied in or may constitute a Hoplon™ station device or a Hoplon™ officer device. The established communication session may include a video link and/or audio link between the client device 210 and the third-party device, where the client device may see and communicate with either the third-party device (e.g., a mobile police office device) and/or an answering station device (e.g., a dispatch operator device in a PSAP; see also FIG. 2). In such instances, the third-party device may present a UI 2000 as is illustrated in FIG. 20. The UI 2000 may include a first section 2010a that may present a first motion picture of the surroundings of the client device 210 and a second section 2010b of that may present a second motion picture of the surroundings of the third-party device. In some embodiments, the UI 2000 may include a first selectable visual element 2020 that, in response to the selection, may cause the third-party device to present a video stream carrying the first motion picture. The UI 2000 also may include a second selectable visual element 2030 that, in response to selection, may terminate the communication session between the client device 210 and the third-party device. In some embodiments, the UI 2000 also may include location information (e.g., GPS coordinates) of the client device 210. The location information may be overlaid on a map of the surroundings of the client device 210 to monitor the movement of the client device 210. Such a communication session may provide individuals the added security of having an officer of emergency personnel track or otherwise follow their location and/or motor a caller's wellbeing without necessarily having an actual police office or an emergency unit in case of no actual emergency. Implementation of such communication sessions is a more efficient solution for security in several environments college campuses over the blue stationary police phone booths.

In some embodiments, a third-party device also may present a UI 2100 as is shown in FIG. 21. In some aspects, the UI 2100 may include a call history associated with an end-user of the third-party device. To that end, the end-user may login to an answering server device (e.g., answering server device 250). In some embodiments, one or more safety components retained in the answering server device may permit or otherwise facilitate the login of the third-party device. The UI 2100 may include a section 2110 including visual elements representative of information about an end-user of the third-party device. The UI 2100 also may include visual elements 2030 representative of a call history associated with the end-user. Similar to other call histories described herein, the visual elements 2030 may include first selectable visual elements that, in response to selection, may cause the third-party device to present records associated with content exchanged between a client device 210 and the third-party device. As described herein, the end-user (e.g., a police officer) of the third-party device may log off from the answering server device to avoid receiving calls while off duty and out of a coverage area of a PSAP, for instance.

In some embodiments of a client device 210, the user-device interaction component 410 may cause a display device of the client device 210 to present a UI 2200 as is illustrated in FIG. 22. In some aspects, the UI 2200 may permit configuring a user profile associated with an end-user of the client device 210. As described herein, the user profile may be retained within a user repository 242 in one or more memory elements 244 (collectively referred to as user profile(s) 244.

FIG. 23 illustrates an example of a computational environment 2300 for emergency responses in accordance with one or more embodiments of the disclosure. The example computational environment 2300 is merely illustrative and is not intended to suggest or otherwise convey any limitation as to the scope of use or functionality of the computational environment's architecture. In addition, the illustrative computational environment 2300 depicted in FIG. 23 should not be interpreted as having any dependency or requirement relating to any one or combination of components illustrated in the example operational environments of the disclosure. The example computational environment 2300 or portions thereof may embody or may constitute the operational environments described hereinbefore. As such, the computing device 2310 may embody or may constitute, for example, any of the communication devices or servers (such as the caller analysis server 140) described herein. In one example, the computing device 2310 may be embodied in a portable personal computer or a handheld computing device, such as a mobile tablet computer, an electronic book reader, a mobile telephone (e.g., a smartphone), and the like. In another example, the computing device 2310 may be embodied in a wearable computing device, such as a watch, goggles, head-mounted visors, or the like. In yet another example, the computing device 2310 may be embodied in portable consumer electronics equipment, such as a camera, a portable television set, a gaming console, a navigation device, a voice-over-internet-protocol telephone, a media playback device, or the like.

The computational environment 2300 represents an example implementation of the various aspects or features of the disclosure in which the processing or execution of operations described in connection with the management of unknown callers in accordance with aspects disclosed herein may be performed in response to the execution of one or more software components by a processor circuit at the computing device 2310. It should be appreciated that the one or more software components may render the computing device 2310, or any other computing device that contains such components, a particular machine for the management of unknown callers in accordance with aspects described herein, among other functional purposes. A software component may be embodied in or may comprise one or more computer-accessible instructions, e.g., computer-readable and/or computer-executable instructions. In one scenario, at least a portion of the computer-accessible instructions may embody and/or may be executed by a processor circuit to perform at least a part of one or more of the example methods described herein, such as the example method presented in FIG. 23. For instance, to embody one such method, at least the portion of the computer-accessible instructions may be retained (e.g., stored, made available, or stored and made available) in a computer storage non-transitory medium and executed by a processor circuit. The one or more computer-accessible instructions that embody a software component may be assembled into one or more program modules, for example, that may be compiled, linked, and/or executed by a processor circuit at the computing device 2310 or other computing devices. Generally, such program modules comprise computer code, routines, programs, objects, components, information structures (e.g., data structures and/or metadata structures), etc., that may perform particular tasks (e.g., one or more operations) in response to execution by one or more processor circuits, which may be integrated into the computing device 2310 or functionally coupled thereto.

The various example embodiments of the disclosure may be operational with numerous other general purpose or special purpose computing system environments or configurations. Examples of well-known computing systems, environments, and/or configurations that may be suitable for implementation of various aspects or features of the disclosure in connection with the management of unknown callers in accordance with aspects described herein may comprise personal computers; server computers; laptop devices; hand-held computing devices, such as mobile tablets or e-readers; wearable computing devices; and multiprocessor systems. Additional examples may include set-top boxes, programmable consumer electronics, network personal computers (PCs), minicomputers, mainframe computers, blade computers, programmable logic controllers, distributed computing environments that comprise any of the above systems or devices, and the like.

As illustrated in FIG. 23, the computing device 2310 may comprise one or more processors 2314, one or more input/output (I/O) interfaces 2316, a memory 2330, and a bus architecture 2332 (also termed bus 2332) that functionally couples various functional elements of the computing device 2310. In certain embodiments, the computing device 2310 may include, optionally, a radio unit 2312. The radio unit 2312 may include one or more antennas and a communication processing unit that may permit wireless communication between the computing device 2310 and another device, such as one of the computing device(s) 2370. The bus 2332 may include at least one of a system bus, a memory bus, an address bus, or a message bus, and may permit the exchange of information (data, metadata, and/or signaling) between the processor(s) 2314, the I/O interface(s) 2316, and/or the memory 2330, or respective functional elements therein. In certain scenarios, the bus 2332 in conjunction with one or more internal programming interfaces 2350 (also referred to as interface(s) 2350) may permit such exchange of information. In scenarios in which the processor(s) 2314 include multiple processors, the computing device 2310 may utilize parallel computing.

The I/O interface(s) 2316 may permit communication of information between the computing device and an external device, such as another computing device, e.g., a network element or an end-user device. Such communication may include direct communication or indirect communication, such as the exchange of information between the computing device 2310 and the external device via a network or elements thereof. As illustrated, the I/O interface(s) 2316 may comprise one or more of network adapter(s) 2318, peripheral adapter(s) 2322, and display unit(s) 2326. Such adapter(s) may permit or facilitate connectivity between the external device and one or more of the processor(s) 2314 or the memory 2330. For example, the peripheral adapter(s) 2322 may include a group of ports, which may include at least one of parallel ports, serial ports, Ethernet ports, V.35 ports, or X.21 ports. In certain embodiments, the parallel ports may comprise General Purpose Interface Bus (GPM), IEEE-1284, while the serial ports may include Recommended Standard (RS)-232, V.11, Universal Serial Bus (USB), Fire Wire or IEEE-1394.

In one aspect, at least one of the network adapter(s) 2318 may functionally couple the computing device 2310 to one or more computing devices 2370 via one or more traffic and signaling pipes 2360 that may permit or facilitate the exchange of traffic 2362 and signaling 2364 between the computing device 2310 and the one or more computing devices 2370. Such network coupling provided at least in part by the at least one of the network adapter(s) 2318 may be implemented in a wired environment, a wireless environment, or both. The information that is communicated by the at least one of the network adapter(s) 2318 may result from the implementation of one or more operations of a method in accordance with aspects of this disclosure. Such output may be any form of visual representation, including, but not limited to, textual, graphical, animation, audio, tactile, and the like. In certain scenarios, each of the computing device(s) 2370 may have substantially the same architecture as the computing device 2310. In addition or in the alternative, the display unit(s) 2326 may include functional elements (e.g., lights, such as light-emitting diodes; a display, such as a liquid crystal display (LCD), a plasma monitor, a light-emitting diode (LED) monitor, or an electrochromic monitor; combinations thereof; or the like) that may permit control of the operation of the computing device 2310, or may permit conveying or revealing the operational conditions of the computing device 2310.

In one aspect, the bus 2332 represents one or more of several possible types of bus structures, including a memory bus or a memory controller, a peripheral bus, an accelerated graphics port, and a processor or local bus using any of a variety of bus architectures. As an illustration, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like. The bus 2332, and all buses described herein may be implemented over a wired or wireless network connection and each of the subsystems, including the processor(s) 2314, the memory 2330 and memory elements therein, and the I/O interface(s) 2316 may be contained within one or more remote computing devices 2370 at physically separate locations, connected through buses of this form, in effect implementing a fully distributed system. In certain embodiments, such a distributed system may implement the functionality described herein in a client-host or client-server configuration in which the safety component(s) 2336 or the safety information 2340, or both, may be distributed between the computing device 2310 and at least one of the computing device(s) 2370, and the computing device 2310 and at least one of the computing device(s) 2370 containing a processor circuit may execute such components and/or leverage such information. It should be appreciated that, in an embodiment in which the computing device 2310 embodies or constitutes a client device (e.g., client device 210), the safety component(s) 2336 may be different from those in an embodiment in which the computing device 2310 embodies or constitutes a safety server device (e.g., one of safety server device(s)

240), an answering server device 250, or an answering station device 260 in accordance with aspects of this disclosure.

The computing device 2310 may comprise a variety of computer-readable media. Computer-readable media may be any available media (transitory and non-transitory) that may be accessed by a computing device. In one aspect, computer-readable media may comprise computer non-transitory storage media (or computer-readable non-transitory storage media) and communications media. For example, computer-readable non-transitory storage media may be any available media that may be accessed by the computing device 2310, and may comprise, for example, both volatile and non-volatile media, and removable and/or non-removable media. In one aspect, the memory 2330 may comprise computer-readable media in the form of volatile memory, such as random access memory (RAM), and/or non-volatile memory, such as read-only memory (ROM).

The memory 2330 may comprise functionality instructions storage 2334 and functionality information storage 2338. The functionality instructions storage 2334 may comprise computer-accessible instructions that, in response to execution (by at least one of the processor circuit(s) 2314), may implement one or more of the functionalities of the disclosure. The computer-accessible instructions may embody or may comprise one or more software components illustrated as safety component(s) 2336. In one scenario, execution of at least one component of the safety component(s) 2336 by a processor circuit may implement one or more of the methods described herein, such as the example methods 2400 and 2500. For instance, such execution may cause a processor circuit (e.g., one of the processor(s) 2314) that executes the at least one component to carry out a disclosed example method. It should be appreciated that, in one aspect, a processor circuit of the processor(s) 2314 that executes at least one of the safety component(s) 2336 may retrieve information from or retain information in one or more memory elements 2340 in the functionality information storage 2338 to operate in accordance with the functionality programmed or otherwise configured by the safety component(s) 2336. The one or more memory elements 2340 may be referred to as call response control information 2340. Such information may include at least one of code instructions, information structures, or the like. For instance, at least a portion of such information structures may be indicative or otherwise representative of communication addresses, caller information, response rules, and the like, in accordance with aspects described herein.

At least one of the one or more interfaces 2350 (e.g., application programming interface(s)) may permit or facilitate communication of information between two or more components within the functionality instructions storage 2334. The information that is communicated by the at least one interface may result from the implementation of one or more operations in a method of the disclosure. In certain embodiments, one or more of the functionality instructions storage 2334 and the functionality information storage 2338 may be embodied in or may comprise removable/non-removable, and/or volatile/non-volatile computer storage media.

At least a portion of at least one of the safety component(s) 2336 or the safety information 2340 may program or otherwise configure one or more of the processors 2314 to operate at least in accordance with the functionality described herein. One or more of the processor circuit(s) 2314 may execute at least one of the safety component(s) 2336 and leverage at least a portion of the information in the functionality information storage 2338 to provide emergency responses in accordance with one or more aspects described herein.

It should be appreciated that, in certain scenarios, the functionality instructions storage 2334 may embody or may comprise a computer-readable non-transitory storage medium having computer-accessible instructions that, in response to execution by a processor circuit, cause at least one processor (e.g., one or more of the processor(s) 2314) to perform a group of operations comprising the operations or blocks described in connection with the disclosed methods.

In addition, the memory 2330 may comprise computer-accessible instructions and information (e.g., data, metadata, and/or programming code instructions) that permit or facilitate the operation and/or administration (e.g., upgrades, software installation, any other configuration, or the like) of the computing device 2310. Accordingly, as illustrated, the memory 2330 may comprise a memory element 2342 (labeled operating system (OS) instruction(s) 2342) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 2310 may dictate a suitable OS. The memory 2330 also comprises a system information storage 2346 having data, metadata, and/or programming code that permits or facilitates the operation and/or administration of the computing device 2310. Elements of the OS instruction(s) 2342 and the system information storage 2346 may be accessible or may be operated on by at least one of the processor(s) 2314.

It should be recognized that while the functionality instructions storage 2334 and other processor circuit executable program components, such as the OS instruction(s) 2342, are illustrated herein as discrete blocks, such software components may reside at various times in different memory components of the computing device 2310, and may be executed by at least one of the processor circuit(s) 2314. In certain scenarios, an implementation of the safety component(s) 2336 may be retained on or transmitted across some form of computer-readable media.

The computing device 2310 and/or one of the computing device(s) 2370 may include a power supply (not shown), which may power up components or functional elements within such devices. The power supply may be a rechargeable power supply, e.g., a rechargeable battery, and it may include one or more transformers to achieve a power level suitable for the operation of the computing device 2310 and/or one of the computing device(s) 2370, and components, functional elements, and related circuitry therein. In certain scenarios, the power supply may be attached to a conventional power grid to recharge and ensure that such devices may be operational. In one aspect, the power supply may include an I/O interface (e.g., one of the network adapter(s) 2318) to connect operationally to the conventional power grid. In another aspect, the power supply may include an energy conversion component, such as a solar panel, to provide additional or alternative power resources or autonomy for the computing device 2310 and/or one of the computing device(s) 2370.

The computing device 2310 may operate in a networked environment by utilizing connections to one or more remote computing devices 2370. As an illustration, a remote computing device may be a personal computer, a portable computer, a server, a router, a network computer, a peer device, or other common network node, and so on. As described herein, connections (physical and/or logical) between the computing device 2310 and a computing device of the one or more remote computing devices 2370 may be made via one or more traffic and signaling pipes 2360, which may comprise wired link(s) and/or wireless link(s) and several network elements (such as routers or switches, concentrators, servers, and the like) that form a LAN, a MAN, a WAN, and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods may be practiced in distributed computing environments, such as grid-based environments, where tasks may be performed by remote processing devices (computing device(s) 2370) that are functionally coupled (e.g., communicatively linked or otherwise coupled) through a network having traffic and signaling pipes and related network elements. In a distributed computing environment, in one aspect, one or more software components (such as program modules) may be located in both a local computing device and at least one remote computing device.

FIG. 24 to FIG. 25 illustrate examples of methods for emergency responses in accordance with one or more embodiments of the disclosure. The example method 2400 includes the exchange of information between a client device 2410 and a safety server device 2420. Implementation (e.g., execution) of the example method 2400 may provide integrity to a safety service. At block 2412, the client device 2410 may receive input information indicative of login to an account associated with a safety service. At 2414, the client device may send, to the safety server device, a first message including login information. The login information may include a username and a password and/or other type of credential. The first message may be configured and transmitted according to a defined communication protocol, such as HTTPS, SIP, or the like. At block 2422 the safety server device 2420 may validate or otherwise check the login information. To that end, the safety server device 2420 may compare the login information to other information retained in a user profile associated with the user profile. At block 2424, the safety server 2420 may issue an authorization token for the client device 2410. At 2426 the safety server device 2420 may send, to the client device 2410, a second message including the token information. The first message may be configured and transmitted according to a defined communication protocol, such as HTTPS, SIP, or the like. At 2428, the client device 2410 may send, to the safety server device 2420, a third message including location information representative of a location of the client device 2410. At block 2430, the safety server device 2420 may determine a coverage area associated with the client device. To that end, the safety server device 2420 may perform a point-in-polygon calculation against a predefined group of GPS geofences, for example. A result of the calculation may determine if the client device 2410 is inside a coverage area associated with a PSAP associated with a GPS geofence or outside such a coverage area. At 2432, the safety server device 2420 may send, to the client device 2410 a fourth message including coverage information. The coverage information may convey that the client device 2410 is inside the GPS geofence or outside the GPS geofence. The client device 2410 may receive the coverage information and may configure, using at least a portion of the coverage information, safety functionality of the client device 2410. In a scenario in which the client device 2410 is inside the GPS geofence, the safety functionality may be configured to include video calls, voice calls, and/or chat sessions via an answering server device associated with a PSAP center. In a scenario in which the client device 2410 is outside the GPS geofence, the safety functionality may be limited to placing calls to 911.

A computing device may implement the example method 2500. The computing device may embody or may constitute, for example, a client device in accordance with one more embodiments of the disclosure. At block 2510, the computing device may receive an indication to monitor the acceleration of the computing device. In one aspect, a display device of the computing device may receive the indication in response to the presentation of the selection of a selectable visual element at the display device. At block 2520, the computing device may initiate monitoring of an accelerometer device (e.g., a solid-state accelerometer) of the computing device. At block 2530 the computing device may collect acceleration information (e.g., electric signals, such as a current signal or a voltage signal) indicative of the acceleration of the computing device. At block 2540, the computing device may determine, using at least a portion of the acceleration information, that the computing device satisfies a distress condition. At block 2550, the computing device may validate the distress condition. At block 2560, the computing device may initiate a distress communication with a destination device (e.g., an answering station device) that facilitates the safety service.

The functionality described herein in connection with emergency responses may be customized. Customization provides flexibility and may be made to satisfy specific constraints of an organization (e.g., a local government, a school, and the like) that utilizes or otherwise leverages the functionality described herein. To that end, in some embodiments, a safety server device (e.g., one of the safety server device(s) 240 shown in FIG. 2) may include one or more customization units configured to add functional feature(s) and remove other functional feature(s). Such features may be added and or removed at any time after a safety service platform (e.g., safety service platform 140 shown in FIG. 2) has been provisioned and/or activated. In some embodiments, at least one of the customization unit(s) may cause a display device integrated into or functionally coupled to a safety server device to present a group of selectable visual elements that, in response to selection, permit access to respective configuration functionality. For instance, in response to selection, a selectable visual element (e.g., a block labeled "Pare Functions") may cause the safety server device to present a menu of functionality that is currently available (e.g., active). The menu may include selectable visual elements that, in response to selection, may cause the safety server device to deactivate respective functionality (or, in some embodiments, groups of functionality). In addition or in other embodiments, at least one of the customization unit(s) may cause such a display device to present another group of selectable visual elements that, in response to selection, permit access to respective configuration functionality. For instance, in response to selection, a selectable visual element (e.g., a block labeled "Add Functions") may cause the safety server device to present a menu of functionality that may be made available. The menu may include selectable visual elements that, in response to selection, may cause the safety server device to provision (or otherwise install) and activate respective functionality (or, in some embodiments, groups of functionality).

FIG. 31 shows an embodiment that is used to determine whether a user, perhaps a worker, is within a Defined area of coverage 3102. In FIG. 31, the Defined area of coverage 3102 is a property line of a particular property, although any geographic area or areas, may be used. In some embodiments, the geographic area is not contiguous. In some embodiments, the Defined area of coverage 3102 may be specific for certain heights, for instance, the Defined area of coverage 3102 may cover only floors 4, 5, and 13 of a multi-story building. In some embodiments, the Defined area of coverage 3102 could define city, state, or national boundaries. In some embodiments, the techniques described herein could be used by a government to monitor a prisoner under house arrest or ensure that a person does not go to an area that they are restricted from. In other embodiments, these techniques could be used to monitor the location of firefighters at a fire scene or the location of police resources at a crime scene, so that the firefighters or police could be located quickly. In other embodiments, these techniques could be used to determine which call firefighters are present at a fire in order to determine who should be paid.

In some embodiments, the Defined area of coverage 3102 is a job site. An employer may want to know who is working and when the worker is working. Many job sites are complex, with many entrances and exits across a number of buildings and many acres of land. The industry has found it difficult to monitor the presence of workers, and seeks a tool that can accurately and easily track who is on a job site. Presence on a job site is important for safety, for instance in the location of all workers if there is a fire or other disaster. It may also be important to know if all employees have left the site at the end of the day, so that the job site can be secured. Furthermore, an hourly workforce is difficult to track in a widespread job site for determining compensation and the obligation to pay the workers when they are at work.

The presence or absence from a job site can be determined by setting the Defined area of coverage 3102 and observing which client devices 3104, 3106 are within the Defined area of coverage 3102. In FIG. 31, the client device 3104 is within the Defined area of coverage 3102 and the client device 3106 is outside. In some embodiments, the location information of client device 3106 is ignored while it is outside of the boundary of the Defined area of coverage 3102. Once the client device 3104 crosses the boundary of the Defined area of coverage 3102, the safety service platform 140 can track and store the location information. The location information 246 is compared to the boundary of the Defined area of coverage 3102, and if the location is within the Defined area of coverage 3102, then the location can be tracked. In some embodiments, the crossing of the boundary is the equivalent of punching into a timeclock, electronically recording that the worker has arrived at work, and punching out of a timeclock when the worker crosses outside of the Defined area of coverage 3102. At the end of the shift, the location information 246 can be used to determine who is still on the clock, who is on the job site, and where they are located.

The flowchart 3200 in FIG. 32 shows one possible embodiment of the techniques. At block 3202, the Defined area of coverage 3102 is specified by a user, outlining the job site or the area of interest. Next, in block 3204, the Defined area of coverage 3102 is converted to a digital representation of the Defined area of coverage 3102, perhaps by entering the GPS coordinates of each corner of the Defined area of coverage 3102. In another embodiment, a user draws the Defined area of coverage 3102 on a screen, and the safety service platform 140 software stores the drawing. Then the digital representation of the Defined area of coverage 3102 is loaded into a safety service platform 140. At some point in time, either before or after the previous steps, safety components 316 may be loaded onto one or more client devices 210 at block 3206. In an illustrative example, the safety components 316 may be configured to communicate with the safety service platform 140. The communications between the safety components 316 and the safety service platform 140 may include location information 246 regarding the location of the client device 210.

In block 3208, the safety service platform 140 may monitor the location information 246 of the client device 210. In some cases, the safety service platform 140 polls the safety components 316 of one or more client devices 210 by sending messages requesting the location information 246. This polling could be periodic, perhaps every minute, or requested at random times. In some embodiments, the polling is adjusted based on network load. In other embodiments, the location information 246 is sent from the safety components 316 to the safety service platform 140 only when the location information 246 has changed (or has changed more than a threshold amount). In some embodiments the location information 246 is pushed from the safety components 316 and in other embodiments, the safety service platform 140 pulls the location information 246 from the safety components 316. The 316 may send the location information 246 in a message. The safety service platform 140 may extract the location information 246 from the message.

In block 3210, the safety service platform 140 may disregard the location information of the client devices 210 located outside of the defined area of the coverage. This may be for privacy reasons, or simply because the location information 246 for client devices 210 outside of the Defined area of coverage 3102 may be non-relevant (for example to this embodiment) and would take up space in the database. In block 3212, the safety service platform 140 stores the location information not disregarded of the client device 210 along with date, time, and client device 210 identification information in a database on the safety service platform 140. In block 3214, the safety service platform 140 transmits additional communications to the client device 210 inside of the Defined area of coverage 3102.

In some embodiments, the location information 246 stored in the database is used by the safety service platform 140 to link the user, or worker, in possession of the client device 210 to a specific location at a specific time (block 3216). This information could be linked to a payroll system to determine when the worker starts work and when they leave work, as in block 3218. In other embodiments, the safety service platform 140 uses the location information 246 in the database to find a worker within the Defined area of coverage 3102.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions may be read or otherwise accessed and executed by one or more processor circuits to perform or permit the performance of the operations described herein. The instructions may be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media may include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses, and computer program products. It may be understood that each block of the block diagrams and flowchart illustrations, and combinations of blocks in the block diagrams and flowchart illustrations, respectively, may be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks may be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device containing a processor circuit and the computing device may be a component. One or more components may reside within a process and/or thread of execution. A component may be localized on one computing device or distributed between two or more computing devices. As described herein, a component may execute from various computer-readable non-transitory media having various data structures stored thereon. Components may communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component may be an apparatus with specific functionality provided by mechanical parts operated by electric or electronic circuitry that is controlled by a software application or firmware application executed by a processor circuit, wherein the processor may be internal or external to the apparatus and may execute at least a part of the software or firmware application. As yet another example, a component may be an apparatus that provides specific functionality through electronic components without mechanical parts, and the electronic components may include a processor therein to execute software or firmware that provides, at least in part, the functionality of the electronic components. In certain embodiments, components may communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components may communicate or otherwise be coupled via thermal, mechanical, electrical, and/or electromechanical coupling mechanisms (such as conduits, connectors, combinations thereof, or the like). An interface may include input/output (I/O) components as well as associated processors, applications, and/or other programming components. The terms "component," "environment," "system," "architecture," "interface," "unit," "module," and "pipe" may be utilized interchangeably and may be referred to collectively as functional elements.

As utilized in this disclosure, the term "processor" may refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor may refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor may be implemented as a combination of computing processing units. In certain embodiments, processors may utilize nanoscale architectures such as, but not limited to, molecular and quantum-dot based transistors, switches, and gates, to optimize space usage or enhance the performance of user equipment or other electronic equipment.

As used herein, a singular term may include multiple objects. As used herein, a single element may include multiple such elements. For example, the term "computer" may include a single computer or multiple computers. The phrase "a computer that stores data and runs software," may include a single computer that both stores data and runs software, a first computer that stores data and a second computer that runs software, or multiple computers that together store data and run software, where at least one of the multiple computers stores data and at least one of the multiple computers runs software. For example, the term "processor" may include a single processor or multiple processors. The phrase "a processor that stores data and runs software," may include a single processor that both stores data and runs software, a first processor that stores data and a second processor that runs software, or multiple processors that together store data and run software, where at least one of the multiple processors stores data and at least one of the multiple processors runs software. An implementation comprising multiple processors may configure each particular processor of the multiple processors to exclusively execute only a particular task assigned to that particular processor. An implementation comprising multiple processors may configure each particular processor of the multiple processors to execute any task of multiple tasks assigned to that particular processor by a scheduler such that a different task may be assigned to different processors at different times. As used herein in an apparatus or a computer-readable medium, "at least one" object rather than or in addition to a single object may perform the claimed operations. For example, "a computer-readable medium" may be construed as "at least one computer-readable medium," and "an apparatus comprising a processor and a memory" may be construed as "a system comprising processing circuitry and a memory subsystem," or "a system comprising processing circuitry and memory" (where memory lacks the article 'a'). It should be noted that a skilled person would understand that "processing circuitry" may include a single processor or multiple processors. Similarly "memory subsystem" or "memory" (lacking an article) may include a single memory unit or multiple memory unit.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It may be appreciated that the memory components or memories described herein embody or comprise non-transitory computer storage media that may be readable or otherwise accessible by a computing device. Such media may be implemented in any methods or technology for storage of information such as computer-readable instructions, information structures, program modules, or other information objects. The memory components or memories may be either volatile memory or non-volatile memory, or may include both volatile and non-volatile memory. In addition, the memory components or memories may be removable or non-removable, and/or internal or external to a computing device or component. Examples of various types of non-transitory storage media may include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which may be accessed by a computing device.

As an illustration, non-volatile memory may include read only memory (ROM), programmable ROM (PROM), electrically programmable ROM (EPROM), electrically erasable programmable ROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "may," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that may provide emergency responses within a defined coverage area. It is, of course, not possible to describe every conceivable combination of elements and/or methods for purposes of describing the various features of the disclosure, but it may be recognized that many further combinations and permutations of the disclosed features are possible. Accordingly, it may be apparent that various modifications may be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

The invention claimed is:

1. A system for filtering location information of devices for further communication and providing emergency responses, the system comprising:
  one or more processors; and
  one or more non-transitory computer-readable media that collectively store instructions that, when executed by the one or more processors, cause the system to perform operations comprising:
    receiving a first call connection request, from a first caller device at a first location, to establish a first connection with a first destination device:
      wherein, the first destination device is associated with a safety service platform;
      wherein, the safety service platform comprises at least:
        a first group of safety service platform devices; and
        a safety server device, wherein the safety server device is within the safety service platform;
    receiving a second call connection request, from a second call device at a second location, to establish a second connection with the first destination device;
    in response to determining, by the safety server device, that the first location is outside of a first coverage area, sending a connection denial message to the first mobile device from the safety service platform;
      wherein the first coverage area corresponds to a public-safety answering point (PSAP) center;
    in response to determining, by the safety server device, that the second location is within the first coverage area, sending a connect information message to the second mobile device from the safety service platform:
      wherein the connect information message comprises a communication address of a remote service device within a group of answering platform devices;
      wherein, the remote server device comprises an answering server device;
      wherein, the answering service device is coupled to an answering station device;
    determining, by the answering station device, a number of call connection requests originated from the first coverage area; and
    in response to the number of call connection requests exceeding a predetermined threshold number:
      presenting, by a first display device, a plurality of predetermined messages;
      selecting one of the predetermined messages; and
      transmitting the selected one of the predetermined message to selected caller devices located within the first coverage area, wherein the selected message provides notification to the selected caller devices that help has been dispatched.

2. The system of claim 1, wherein receiving the connect denial message by the first mobile device causes the first caller device to direct a first end-user to dial 911.

3. The system of claim 1, wherein the connect information message includes an Internet Protocol (IP) address of the answering server device.

4. The system of claim 1, the operations further comprising:
  exchanging first session content between the first destination device and the second caller device; and
  forwarding, by the first destination device, at least a portion of the first session content to a third-party device.

5. The system of claim 1, the operations further comprising:
  gathering, by the first destination device, contact information for the second caller device;
  determining, by the first destination device, that the second connect with the second caller device has been lost; and
  upon determining, by the first destination device, that the second connection to the second mobile caller device has been lost, initiating a first reconnection process to establish a third connection with the second mobile device based on the contact information for the second caller device.

6. The system of claim 5, wherein the first reconnection process comprises sending a text message or a phone call to the second caller device.

7. The system of claim 1, the operations further comprising:
  establishing, by the answering server device, a third connection between the second caller device and a first streaming server;
  wherein, the first streaming server includes at least one safety unit.

8. The system of claim 1, the operations further comprising:
  sending, by the answering server device, the selected one of the predetermined message to the second caller device.

9. The system of claim 8, wherein the selected one of the predetermined message is sent in response to a first selection of the predetermined message using the first display device.

10. The system of claim 1, the operations further comprising:

generating location information, using a location unit that is functionally coupled to a radio unit receiving timing messages from one or more satellites via respective deep-space links.

11. The system of claim 10, the operations further comprising:

sending the timing messages to the location unit using the radio unit.

12. The system of claim 11, wherein the location unit determines an estimate of the first location and/or the second location using at least the timing messages.

13. The system of claim 12, wherein the location information comprises GPS coordinates, Wi-Fi signals, and/or cellular signals.

14. The system of claim 13, wherein the radio unit includes one or more antennas and a multi-mode communication processing unit that processes multiple types of wireless signals received by at least one of the one or more antennas.

15. A method for filtering location information of devices for further communication and providing emergency responses, the method comprising:

receiving a first call connection request, from a first caller device at a first location, to establish a first connection with a first destination device:

wherein, the first destination device is associated with a safety service platform;

wherein, the safety service platform comprises at least:

a first group of safety service platform devices; and a safety server device, wherein the safety server device is within the safety service platform;

receiving a second call connection request, from a second call device at a second location, to establish a second connection with the first destination device;

in response to determining, by the safety server device, that the first location is outside of a first coverage area, sending a connection denial message to the first mobile device from the safety service platform;

wherein the first coverage area corresponds to a public-safety answering point (PSAP) center;

in response to determining, by the safety server device, that the second location is within the first coverage area, sending a connect information message to the second mobile device from the safety service platform:

wherein the connect information message comprises a communication address of a remote service device within a group of answering platform devices;

wherein, the remote server device comprises an answering server device;

wherein, the answering service device is coupled to an answering station device;

determining, by the answering station device, a number of call connection requests originated from the first coverage area; and in response to the number of call connection requests exceeding a predetermined threshold number:

presenting, by a first display device, a plurality of predetermined messages;

selecting one of the predetermined messages; and transmitting the selected one of the predetermined message to selected caller devices located within the first coverage area, wherein the selected message provides notification to the selected caller devices that help has been dispatched.

* * * * *